US008825005B2

(12) United States Patent
Ando et al.

(10) Patent No.: US 8,825,005 B2
(45) Date of Patent: Sep. 2, 2014

(54) USAGE MANAGEMENT SYSTEM AND USAGE MANAGEMENT METHOD

(75) Inventors: Tatsuhiro Ando, Kawasaki (JP); Kiyomi Hasesaka, Kawasaki (JP); Satoshi Maehara, Kawasaki (JP); Tatsuo Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 23 days.

(21) Appl. No.: 13/326,426

(22) Filed: Dec. 15, 2011

(65) Prior Publication Data

US 2012/0164976 A1 Jun. 28, 2012

(30) Foreign Application Priority Data

Dec. 27, 2010 (JP) ................................. 2010-291179

(51) Int. Cl.
*H04M 1/66* (2006.01)
*H04W 24/00* (2009.01)
*H04W 12/12* (2009.01)
*H04W 12/06* (2009.01)
*H04W 64/00* (2009.01)
*H04L 29/06* (2006.01)

(52) U.S. Cl.
CPC .............. *H04W 12/12* (2013.01); *H04W 12/06* (2013.01); *H04W 64/00* (2013.01); *H04L 63/08* (2013.01)
USPC ......................... 455/410; 455/411; 455/456.1

(58) Field of Classification Search
CPC ..... H04W 12/12; H04W 12/06; H04W 88/02; H04W 64/00; H04W 4/02; H04L 63/08; H04L 29/08657
USPC ........... 455/410, 404.2, 411, 414.2, 418–421, 455/425, 41.1, 41.2, 68, 92, 422.1, 455/435.1–435.3, 456.1–456.6
See application file for complete search history.

(56) References Cited

U.S. PATENT DOCUMENTS

| 2004/0107352 | A1 | 6/2004 | Yui et al. |
| 2006/0031459 | A1* | 2/2006 | Ahn et al. ..................... 709/224 |
| 2006/0053447 | A1* | 3/2006 | Krzyzanowski et al. ....... 725/40 |
| 2007/0290884 | A1* | 12/2007 | Ishimoto et al. ......... 340/825.72 |
| 2008/0320558 | A1 | 12/2008 | Imanishi et al. |
| 2010/0212001 | A1* | 8/2010 | Kashyap et al. .................. 726/7 |

FOREIGN PATENT DOCUMENTS

| JP | 9-152990 | 6/1997 |
| JP | 2004-96294 | 3/2004 |
| JP | 2006-203507 | 8/2006 |
| JP | 2008-225823 | 9/2008 |
| JP | 2009-5030 | 1/2009 |

OTHER PUBLICATIONS

Japanese Office Action issued May 13, 2014 in corresponding Japanese Patent Application No. 2010-291179.

* cited by examiner

*Primary Examiner* — Ajit Patel
(74) *Attorney, Agent, or Firm* — Staas & Halsey LLP

(57) ABSTRACT

A usage management system includes a first storage and a processor. The first storage stores, for each communication area and for each user, usage restriction information regarding a network device which locates in each communication area and which is used by each user and connectable to a communication network. The processor identifies a location area which is a communication area in which a target network device locates, identifies a target user present in the identified location area, acquires usage restriction information regarding the target network device for the identified target user from the first storage, and controls operations of the target network device in accordance with the acquired usage restriction information.

8 Claims, 23 Drawing Sheets

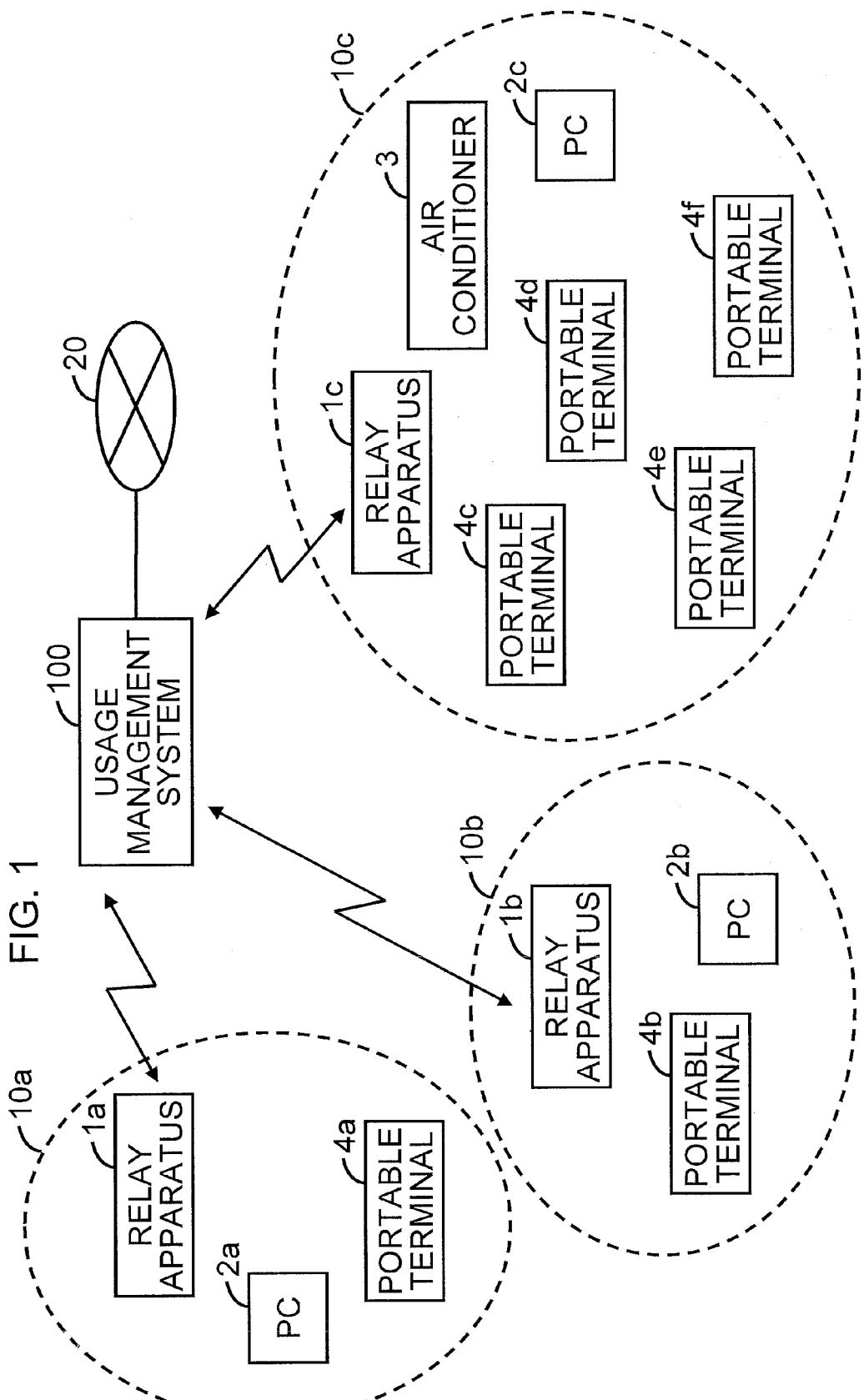

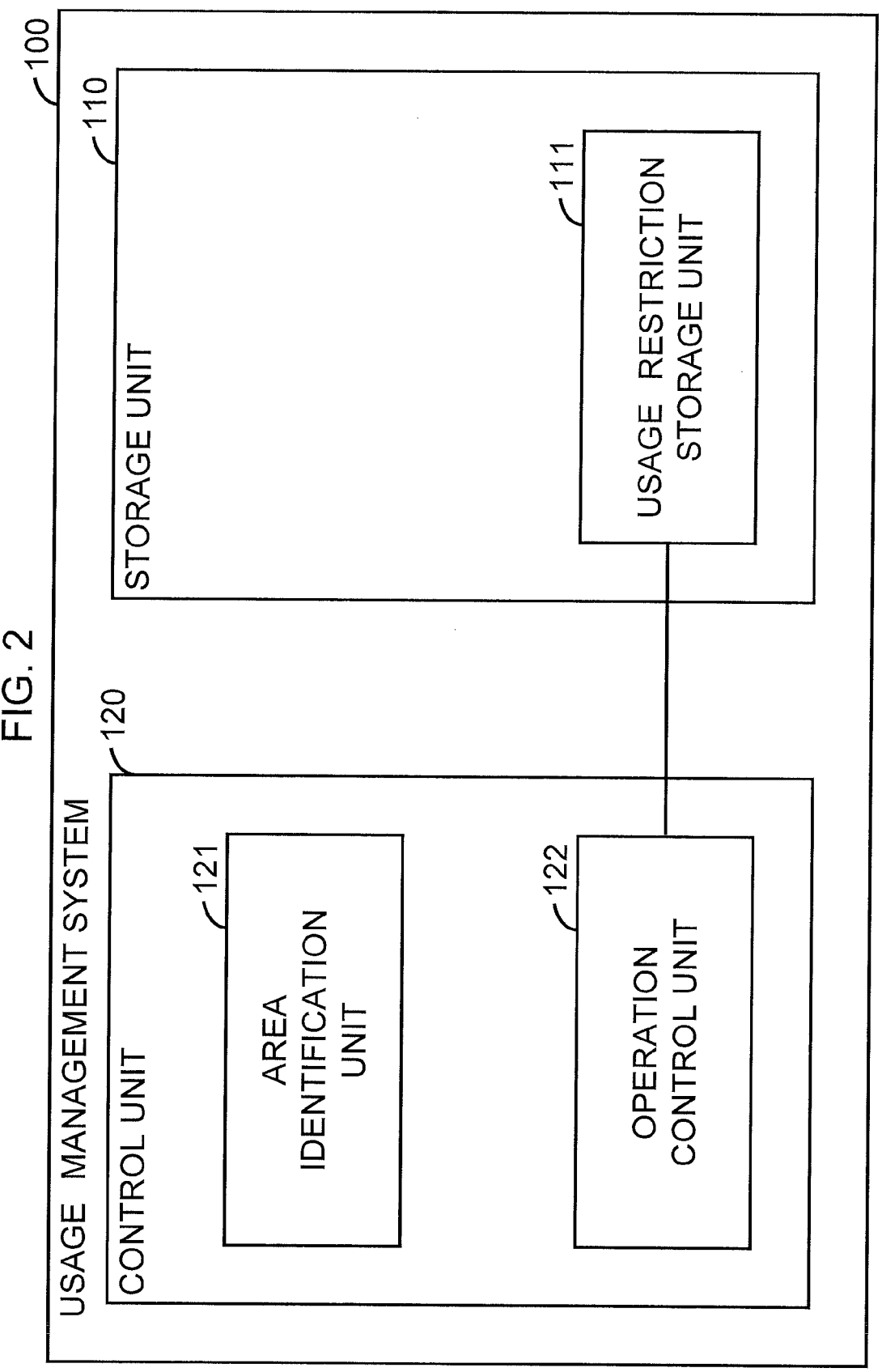

FIG. 3

| USER | USER IDENTIFYING TERMINAL | SITE ACCESS (S-D10a) | SITE ACCESS (S-D10b) | SITE ACCESS (S-D10c) | ... |
|---|---|---|---|---|---|
| Yoshio (Father) | MAC ADDRESS (TERMINAL 4c) | N-R | N-R | N-R | ... |
| Yoshiko (Mother) | MAC ADDRESS (TERMINAL 4d) | N-R | N-R | N-R | ... |
| Taro (Elder Brother) | MAC ADDRESS (TERMINAL 4b) | N-R | N-R | N-R | ... |
| Hanako (Elder Sister) | MAC ADDRESS (TERMINAL 4e) | R-15 | R-15 | N-R | ... |
| Takuro (Younger Brother) | MAC ADDRESS (TERMINAL 4a) | R-15 | R-15 | N-R | ... |
| Hinako (Younger Sister) | MAC ADDRESS (TERMINAL 4f) | R-15 | R-15 | N-R | ... |
| UNIDENTIFIED | | DENIED | DENIED | DENIED | ... |
| ... | ... | ... | ... | ... | ... |

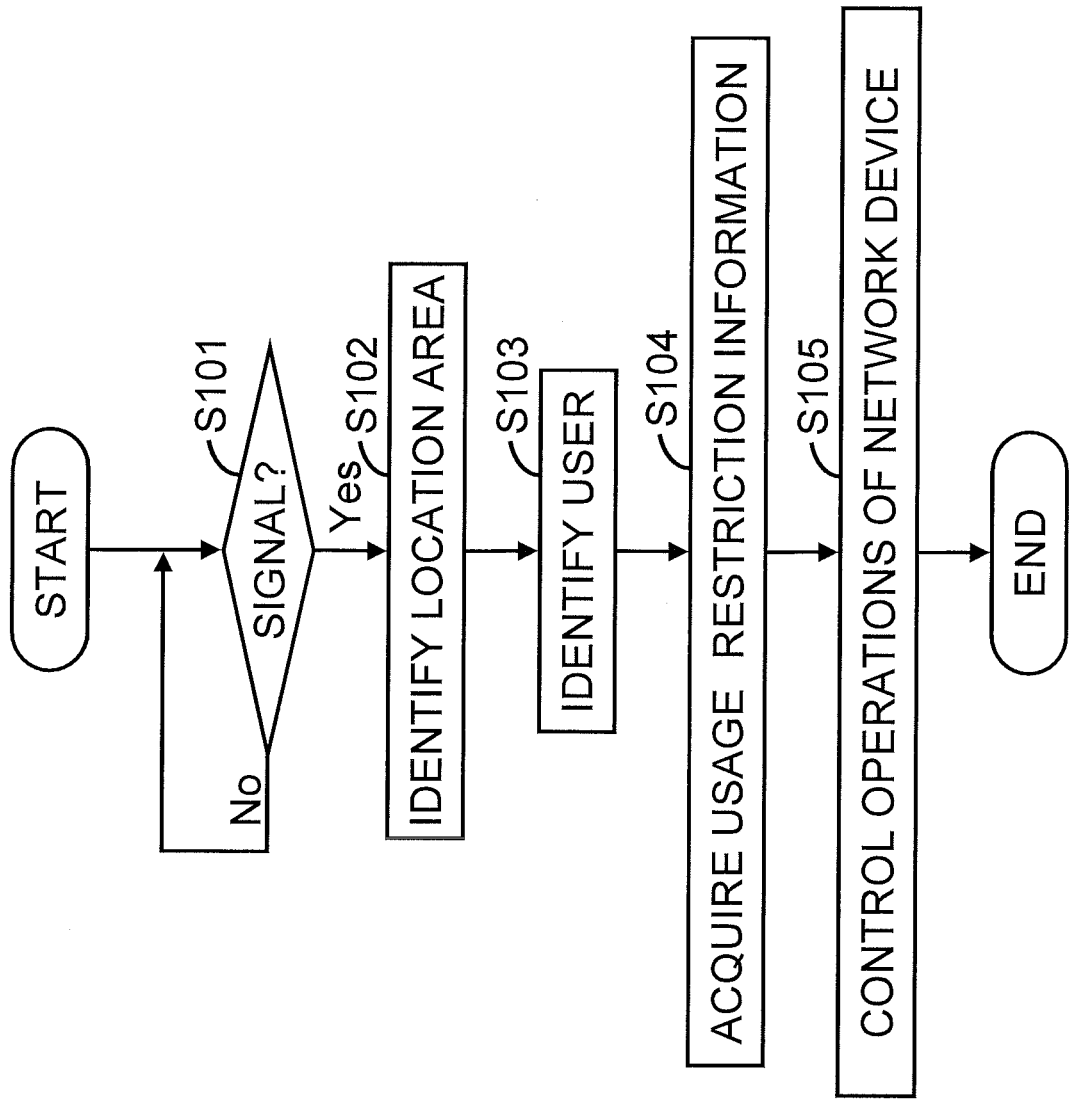

FIG. 6

| NETWORK DEVICE | PRIORITY ORDERING PATTERN |
|---|---|
| MAC ADDRESS (PC 2c) | 2 |
| MAC ADDRESS (TV) | 1 |
| MAC ADDRESS (AIR CONDITIONER 3) | 3 |
| ... | ... |

| USER | P.O.P. 1 | P.O.P. 2 | ... | USER IDENTIFYING TERMINAL | SITE ACCESS (S-D10a) | SITE ACCESS (S-D10b) | SITE ACCESS (S-D10c) | ... |
|---|---|---|---|---|---|---|---|---|
| Yoshio (Father) | 6 | 1 | ... | MAC ADDRESS (TERMINAL 4c) | N-R | N-R | N-R | ... |
| Yoshiko (Mother) | 5 | 2 | ... | MAC ADDRESS (TERMINAL 4d) | N-R | N-R | N-R | ... |
| Taro (Elder Brother) | 4 | 3 | ... | MAC ADDRESS (TERMINAL 4b) | N-R | N-R | N-R | ... |
| Hanako (Elder Sister) | 3 | 4 | ... | MAC ADDRESS (TERMINAL 4e) | R-15 | R-15 | N-R | ... |
| Takuro (Younger Brother) | 2 | 5 | ... | MAC ADDRESS (TERMINAL 4a) | R-15 | R-15 | N-R | ... |
| Hinako (Younger Sister) | 1 | 6 | ... | MAC ADDRESS (TERMINAL 4f) | R-15 | R-15 | N-R | ... |
| UNIDENTIFIED | - | - | ... |  | DENIED | DENIED | DENIED | ... |
| ... | ... | ... | ... | ... | ... | ... | ... | ... |

| USER | GENDER | AGE | BIRTHDAY | USER IDENTIFYING TERMINAL | SITE ACCESS (S-D10a) | SITE ACCESS (S-D10b) | SITE ACCESS (S-D10c) | ... |
|---|---|---|---|---|---|---|---|---|
| Yoshio [Father] | MALE | 42 | 1967XXXX | MAC ADDRESS (TERMINAL 4c) | N-R | N-R | N-R | ... |
| Yoshiko [Mother] | FEMALE | 38 | 1971XXXX | MAC ADDRESS (TERMINAL 4d) | N-R | N-R | N-R | ... |
| Taro [Elder Brother] | MALE | 16 | 1993XXXX | MAC ADDRESS (TERMINAL 4b) | N-R | N-R | N-R | ... |
| Hanako [Elder Sister] | FEMALE | 14 | 1995XXXX | MAC ADDRESS (TERMINAL 4e) | R-15 | R-15 | N-R | ... |
| Takuro [Younger Brother] | MALE | 12 | 1997XXXX | MAC ADDRESS (TERMINAL 4a) | R-15 | R-15 | N-R | ... |
| Hinako [Younger Sister] | FEMALE | 10 | 1999XXXX | MAC ADDRESS (TERMINAL 4f) | R-15 | R-15 | N-R | ... |
| UNIDENTIFIED | - | - | - | | DENIED | DENIED | DENIED | ... |
| ... | ... | ... | ... | ... | ... | ... | ... | ... |

| USER TYPE | DEVICE SETTING (S-D10a) | DEVICE SETTING (S-D10b) | DEVICE SETTING (S-D10c) | SITE ACCESS (S-D10a) | SITE ACCESS (S-D10b) | SITE ACCESS (S-D10c) | ... |
|---|---|---|---|---|---|---|---|
| MALE ONLY | AC 22°C | AC 22°C | AC 22°C | N-R | N-R | N-R | ... |
| FEMALE ONLY | AC 28°C | AC 28°C | AC 28°C | N-R | N-R | N-R | ... |
| ADULT ONLY | NO POLICY | NO POLICY | NO POLICY | N-R | N-R | N-R | ... |
| CHILD ONLY | AC OFF | AC OFF | AC OFF | R-15 | R-15 | R-15 | ... |
| MIXED | NO POLICY | NO POLICY | NO POLICY | N-R | N-R | N-R | ... |
| ... | ... | ... | ... | ... | ... | ... | ... |

313

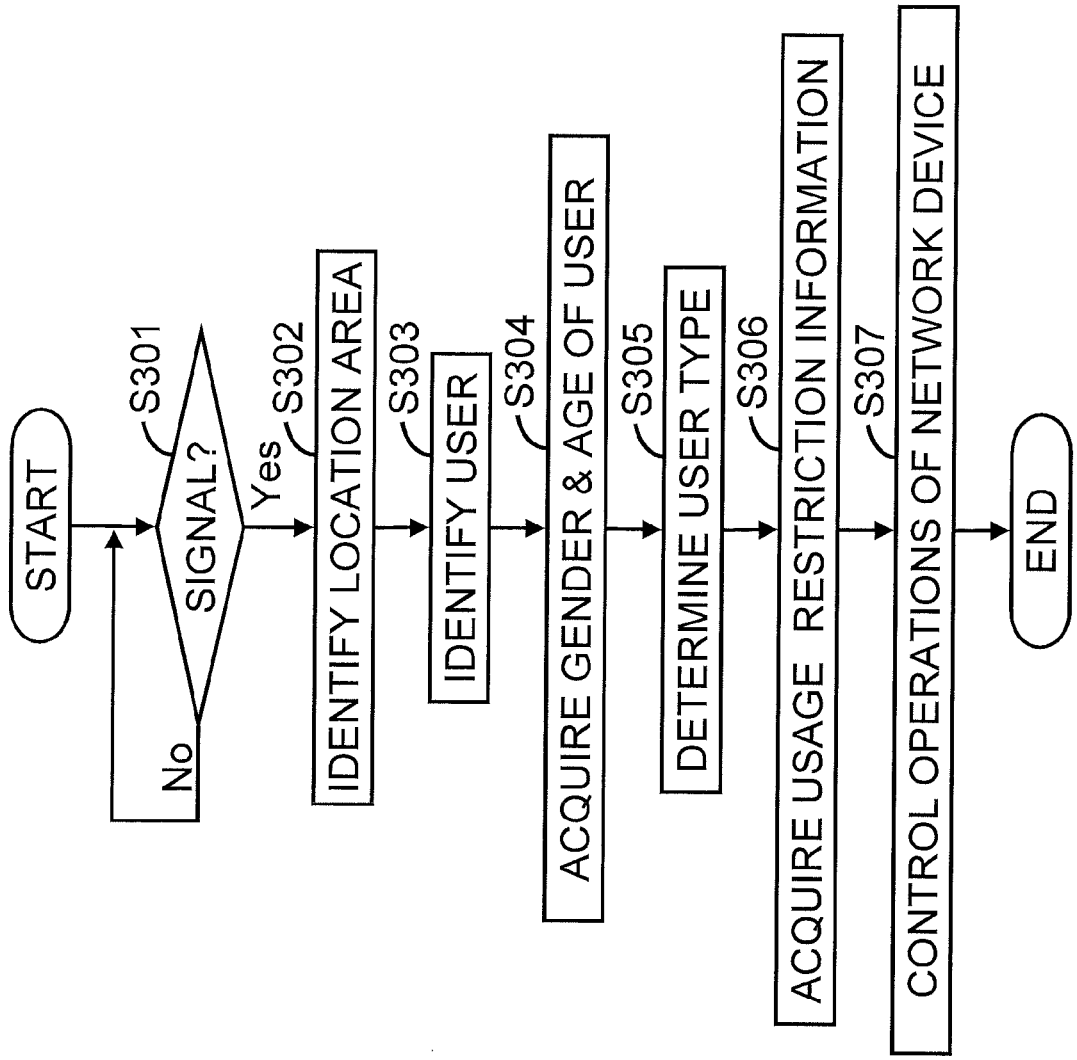

FIG. 13

| NETWORK DEVICE | USER | LOCATION AREA | IP ADDRESS | PRIVATE /SHARED | P.O.P. | GENDER TYPE | ADULT /CHILD |
|---|---|---|---|---|---|---|---|
| MAC ADDRESS (TERMINAL 4a) | Takuro | MAC ADDRESS (RELAY 1a) | IP ADDRESS (TERMINAL 4a) | PRIVATE | - | MALE | CHILD |
| MAC ADDRESS (TERMINAL 4b) | Taro | MAC ADDRESS (RELAY 1b) | IP ADDRESS (TERMINAL 4b) | PRIVATE | - | MALE | CHILD |
| MAC ADDRESS (TERMINAL 4c) | Yoshio | MAC ADDRESS (RELAY 1c) | IP ADDRESS (TERMINAL 4c) | PRIVATE | - | MALE | ADULT |
| MAC ADDRESS (TERMINAL 4d) | Yoshiko | MAC ADDRESS (RELAY 1c) | IP ADDRESS (TERMINAL 4d) | PRIVATE | - | FEMALE | ADULT |
| MAC ADDRESS (TERMINAL 4e) | Hanako | MAC ADDRESS (RELAY 1c) | IP ADDRESS (TERMINAL 4e) | PRIVATE | - | FEMALE | CHILD |
| MAC ADDRESS (TERMINAL 4f) | Hinako | MAC ADDRESS (RELAY 1c) | IP ADDRESS (TERMINAL 4f) | PRIVATE | - | FEMALE | CHILD |
| MAC ADDRESS (PC) | Taro | MAC ADDRESS (RELAY 1b) | IP ADDRESS (PC) | PRIVATE | - | MALE | CHILD |
| MAC ADDRESS (TV) | Hinako | MAC ADDRESS (RELAY 1c) | IP ADDRESS (TV) | SHARED | 1 | MALE or FEMALE | CHILD or ADULT |
| MAC ADDRESS (AC) | Taro | MAC ADDRESS (RELAY 1b) | IP ADDRESS (AC) | SHARED | 2 | MALE ONLY | CHILD ONLY |
| ... | ... | ... | ... | ... | ... | ... | ... |

FIG. 14

| USER | P.O.P.1 | P.O.P.2 | ... | GENDER | AGE | BIRTHDAY | USER IDENTIFYING TERMINAL | SITE ACCESS (S.D.10a) | SITE ACCESS (S.D.10b) | SITE ACCESS (S.D.10c) | ... |
|---|---|---|---|---|---|---|---|---|---|---|---|
| Yoshio [Father] | 6 | 1 | ... | MALE | 42 | 1967XXXX | MAC ADDRESS (TERMINAL 4c) | N-R | N-R | N-R | ... |
| Yoshiko [Mother] | 5 | 2 | ... | FEMALE | 38 | 1971XXXX | MAC ADDRESS (TERMINAL 4d) | N-R | N-R | N-R | ... |
| Taro [Elder Brother] | 4 | 3 | ... | MALE | 16 | 1993XXXX | MAC ADDRESS (TERMINAL 4b) | N-R | N-R | N-R | ... |
| Hanako [Elder Sister] | 3 | 4 | ... | FEMALE | 14 | 1995XXXX | MAC ADDRESS (TERMINAL 4e) | R-15 | R-15 | N-R | ... |
| Takuro [Younger Brother] | 2 | 5 | ... | MALE | 12 | 1997XXXX | MAC ADDRESS (TERMINAL 4a) | R-15 | R-15 | N-R | ... |
| Hinako [Younger Sister] | 1 | 6 | ... | FEMALE | 10 | 1999XXXX | MAC ADDRESS (TERMINAL 4f) | R-15 | R-15 | N-R | ... |
| UNIDENTIFIED | - | - | ... | - | - | - | | DENIED | DENIED | DENIED | ... |
| | ... | ... | ... | ... | ... | ... | ... | ... | ... | ... | ... |

FIG. 15

| USER TERMINAL | USER |
|---|---|
| MAC ADDRESS (PC) | Taro |
| ... | ... |

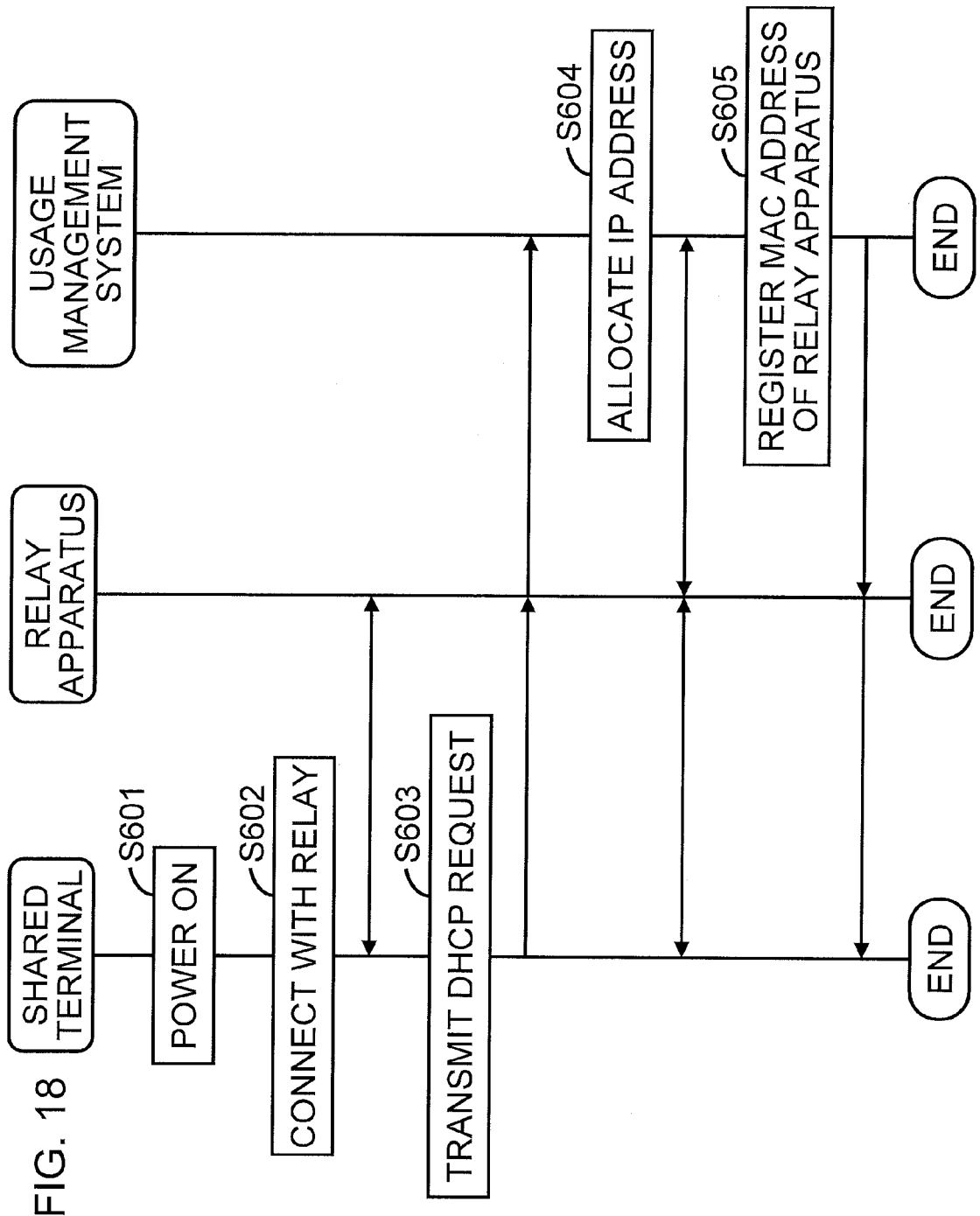

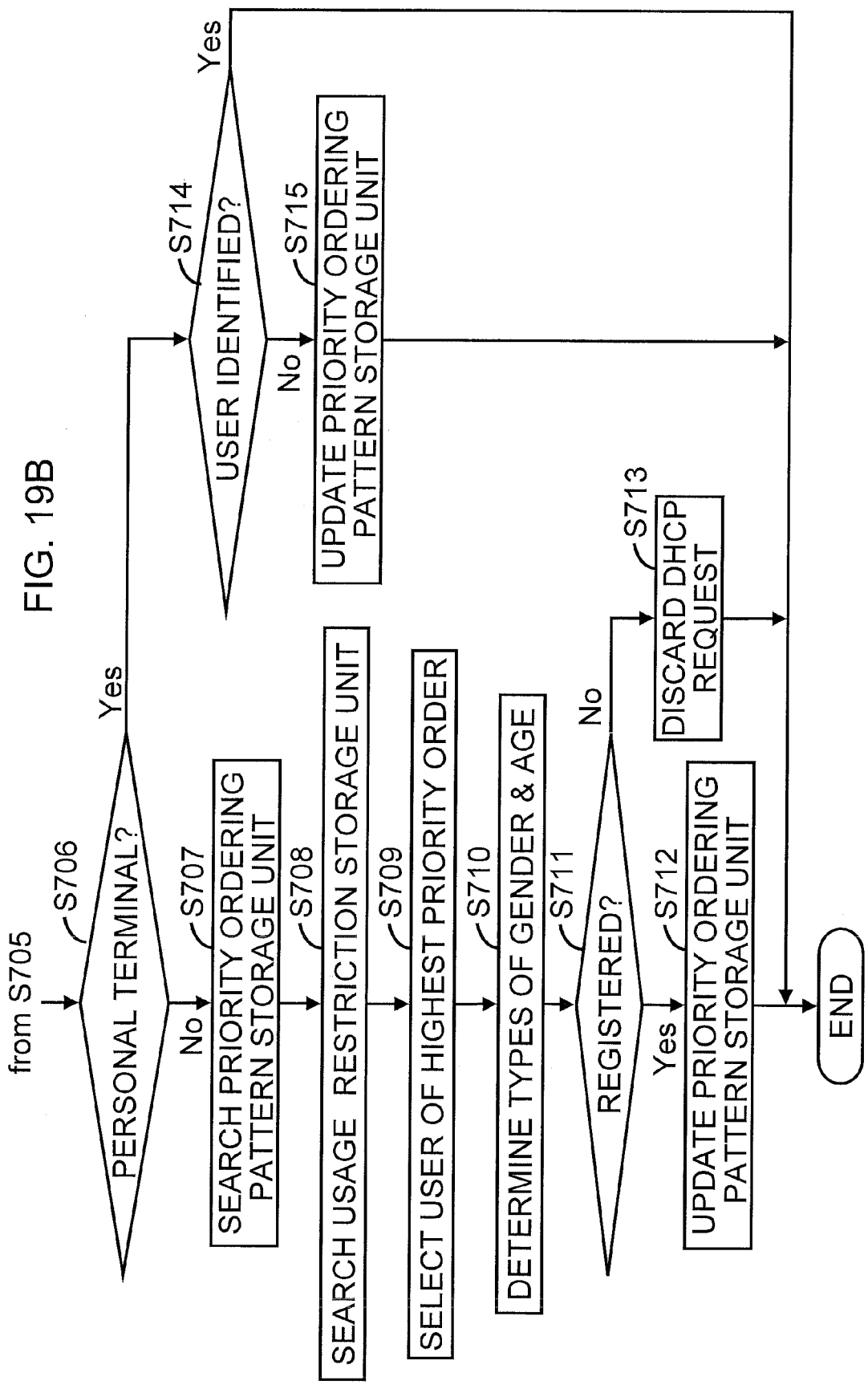

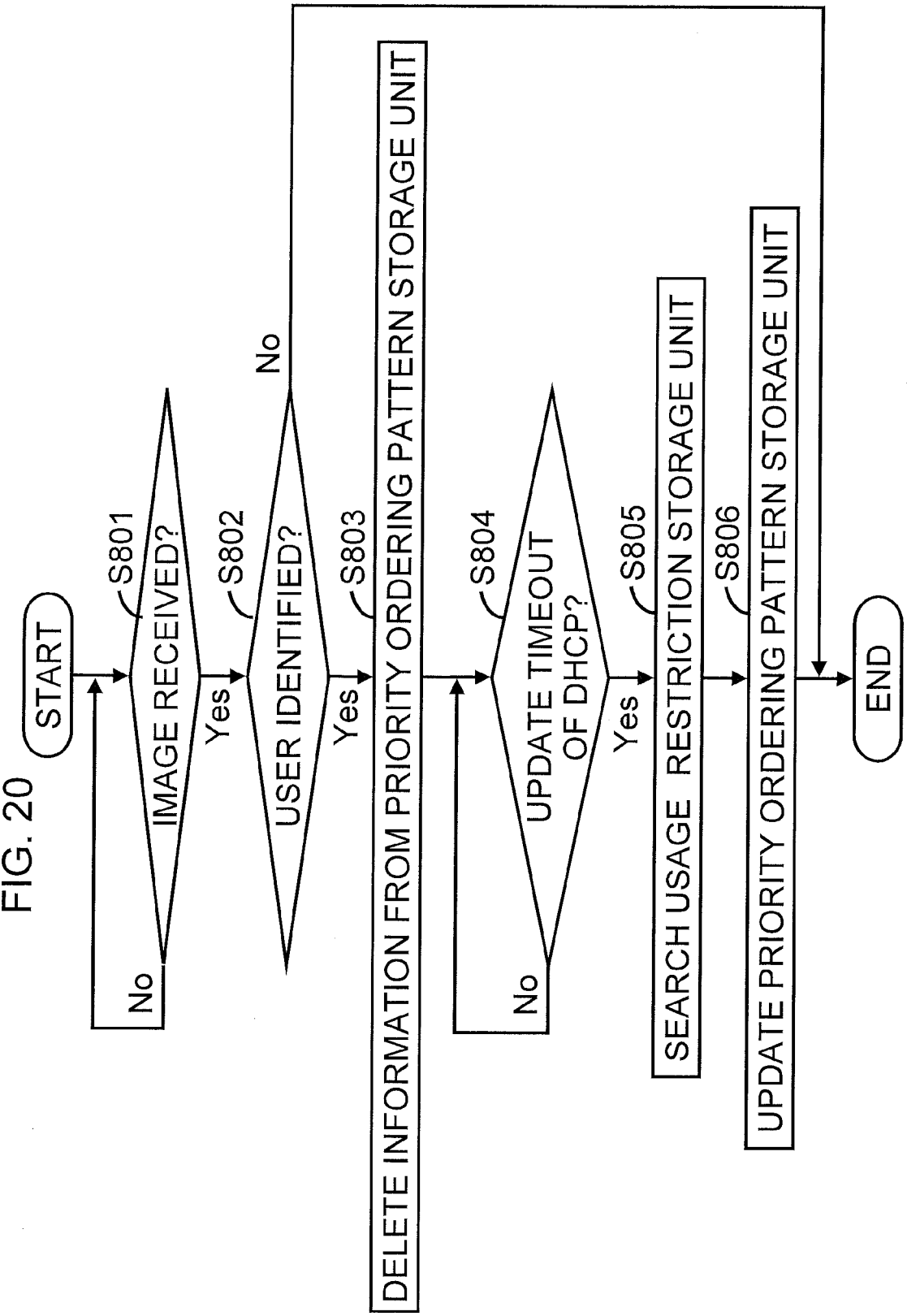

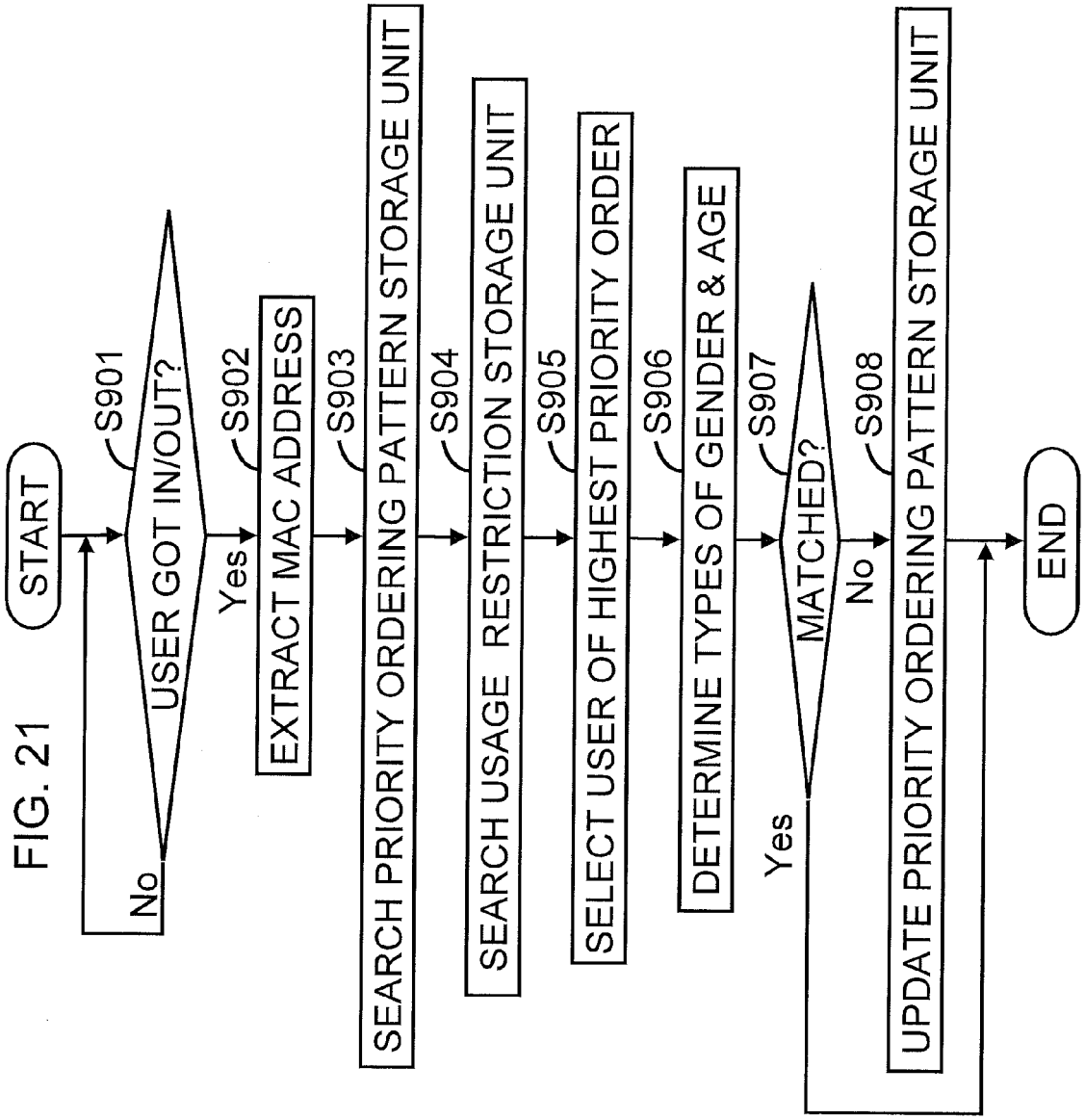

USAGE MANAGEMENT SYSTEM AND USAGE MANAGEMENT METHOD

CROSS-REFERENCE TO RELATED APPLICATION

This application is based upon and claims the benefit of priority of the prior Japanese Patent Application No. 2010-291179, filed on Dec. 27, 2010, the entire contents of which are incorporated herein by reference.

FIELD

The embodiments discussed herein are related to a usage management system and a usage management method.

BACKGROUND

In a conventional home networking technology, communication means are installed in various devices such as power meters and household appliances as well as in information processing apparatuses such as personal computers (PCs), image receivers such as television sets (TVs), and recorders such as hard disk recorders (HDRs). Telecommunications carriers, energy suppliers and others that possess infrastructures relevant to communications, electricity and the like provide services of restricting usage of devices by using the communication means installed in various devices in the home networking technology.

For example, a user of a service for restricting usage of an Internet-accessible PC may request a communications carrier to set a uniform resource locator (URL) of a site to which the user wants to restrict an access. Alternatively, when the access restriction is set on the user's side, the user may set, by using a function provided by the PC, the URL of the site to which the user wants to restrict an access.

Japanese Laid-open Patent Publication No. 9-152990, Japanese Laid-open Patent Publication No. 2006-203507 and Japanese Laid-open Patent Publication No. 2009-5030 disclose related techniques.

SUMMARY

According to an aspect of the present invention, provided is a usage management system. The usage management system includes a first storage and a processor. The first storage stores, for each communication area and for each user, usage restriction information regarding a network device which locates in each communication area and which is used by each user and connectable to a communication network. The processor identifies a location area which is a communication area in which a target network device locates, identifies a target user present in the identified location area, acquires usage restriction information regarding the target network device for the identified target user from the first storage, and controls operations of the target network device in accordance with the acquired usage restriction information.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 1 is a diagram illustrating an exemplary entire configuration of a system including a usage management system;

FIG. 2 is a diagram illustrating an exemplary functional configuration of a usage management system according to an embodiment of the present invention;

FIG. 3 is a diagram illustrating an example of usage restriction information stored in a usage restriction storage unit according to an embodiment of the present invention;

FIG. 4 is a diagram illustrating an exemplary operation flow of an operation controlling process according to an embodiment of the present invention;

FIG. 6 is a diagram illustrating an example of information stored in a priority ordering pattern storage unit according to an embodiment of the present invention;

FIG. 7 is a diagram illustrating an example of usage restriction information stored in a usage restriction storage unit according to an embodiment of the present invention;

FIG. 10 is a diagram illustrating an example of usage restriction information stored in a usage restriction storage unit according to an embodiment of the present invention;

FIG. 11 is a diagram illustrating an example of information stored in a user type storage unit according to an embodiment of the present invention;

FIG. 12 is a diagram illustrating an exemplary operation flow of an operation controlling process according to an embodiment of the present invention;

FIG. 13 is a diagram illustrating an example of information stored in a priority ordering pattern storage unit according to an embodiment of the present invention;

FIG. 14 is a diagram illustrating an example of usage restriction information stored in a usage restriction storage unit according to an embodiment of the present invention;

FIG. 15 is a diagram illustrating an example of information stored in a terminal user storage unit according to an embodiment of the present invention;

FIG. 18 is a diagram illustrating an exemplary operation sequence of a location registering process for a shared terminal according to an embodiment of the present invention;

FIGS. 19A and 19B are diagrams illustrating an exemplary operation flow of a location registering process according to an embodiment of the present invention;

FIG. 20 is a diagram illustrating an exemplary operation flow of a location deleting process according to an embodiment of the present invention;

FIG. 21 is a diagram illustrating an exemplary operation flow of an updating process for usage restriction information according to an embodiment of the present invention.

DESCRIPTION OF EMBODIMENTS

Figure 5:
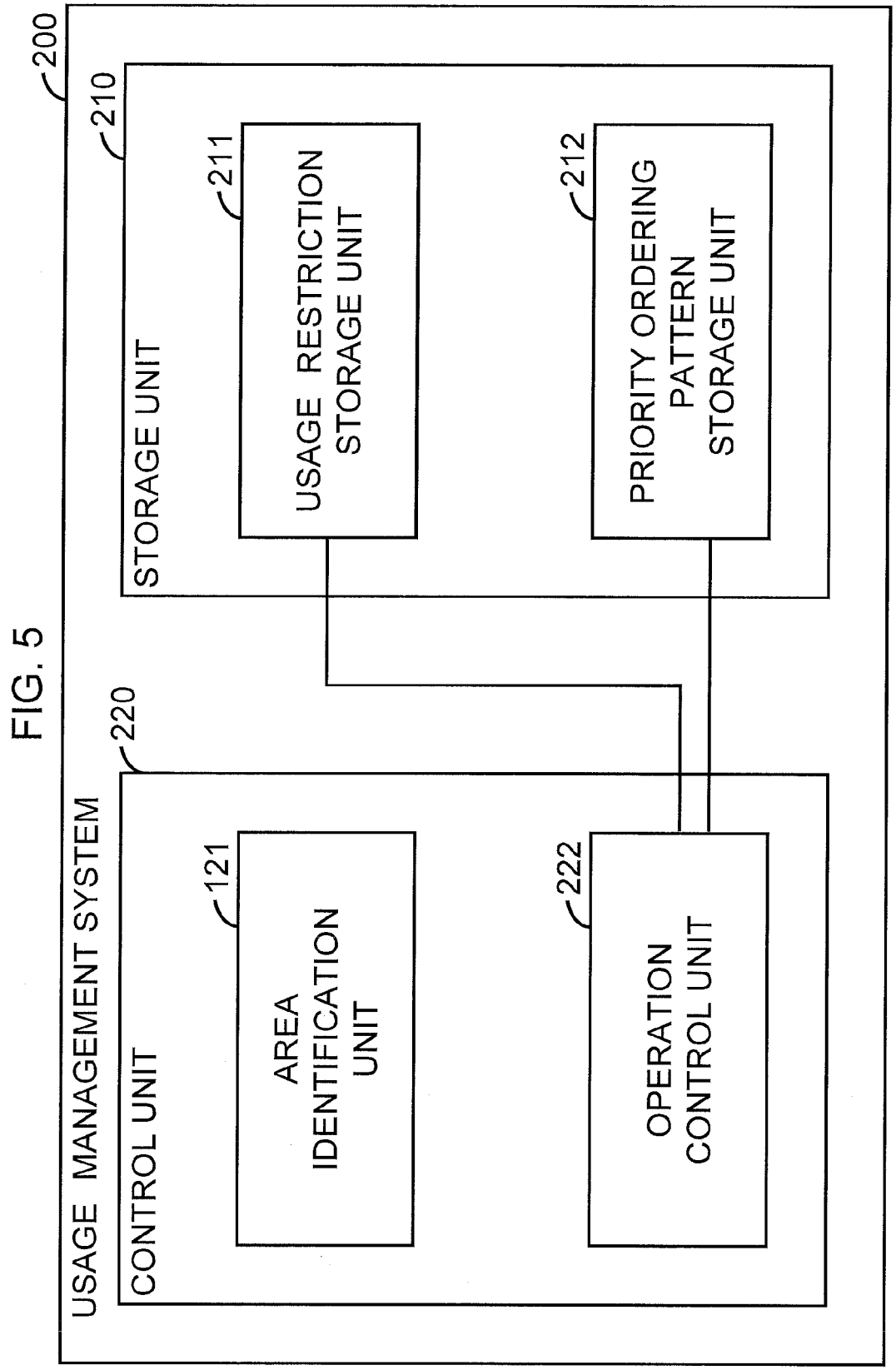
FIG. 5 is a diagram illustrating an exemplary functional configuration of a usage management system according to an embodiment of the present invention.

However, conventional technologies have such a problem that it is difficult to usefully restrict the usage of a network device. For example, since restriction services provided by a communications carrier or an energy supplier and usage restrictions on a device which is set by a user by using the function provided by the device are set for each device, it is difficult to flexibly perform the usage restrictions. Such a problem as mentioned above may occur not only in home to which the home networking technology is applied but also in network systems used in enterprises, schools and the like.

Therefore, it may be preferable to provide a usage management system and a usage management method that allow useful usage restriction on a network device.

Embodiments of the usage management system and the usage management method discussed in the present application may allow useful usage restriction on a network device.

Embodiments of the usage management system and the usage management method will be discussed with reference to the accompanying drawings. The embodiments are not limited to those that will be discussed hereinafter. Respective embodiments may be appropriately combined with one another within a scope not inducing an inconsistency.

First Embodiment

System Configuration

FIG. 1 illustrates an exemplary entire configuration of a system including a usage management system. An example of an entire configuration of a system including a usage management system will be discussed with reference to FIG. 1.

For example, as illustrated in FIG. 1, a system including a usage management system includes a usage management system 100, a relay apparatus 1a, a relay apparatus 1b and a relay apparatus 1c. The system including the usage management system also includes a PC 2a, a PC 2b, a PC 2c, and an air conditioner (AC) 3. In addition, the system including the usage management system further includes a portable terminal 4a, a portable terminal 4b, a portable terminal 4c, a portable terminal 4d, a portable terminal 4e and a portable terminal 4f.

The relay apparatuses 1a to 1c are, for example, access points (APs) and hubs in a wireless local area network (LAN) and are in wired or wireless connection with the usage management system 100. For example, the relay apparatuses 1a to 1c respectively execute relay processing of receiving signals from devices such as the PCs 2a to 2c, the air conditioner 3 and the portable terminals 4a to 4f to notify the usage management system 100 of the received signals and receiving a signal from the usage management system 100 to notify the above mentioned devices of the received signal.

Respective relay apparatuses 1a to 1c have respective areas of communication via a wireless LAN. In the example illustrated in FIG. 1, a sub-domain 10a is the communication area of the relay apparatus 1a, a sub-domain 10b is the communication area of the relay apparatus 1b and a sub-domain 10c is the communication area of the relay apparatus 1c. These sub-domains are encircled by broken lines. Each of the communication areas of the sub-domains 10a to 10c which are encircled by the broken lines corresponds to each room in a house in one specific example. That is, the number of relay apparatuses is not limited to that illustrated in FIG. 1 and may be different for the number of rooms and the number of areas to be set. In addition, above mentioned configurations may be applicable to systems in enterprises and/or schools in a similar manner to the above.

The PCs 2a to 2c are network devices that, for example, execute various information processing operations, respectively locate in the sub-domains 10a to 10c and include communication means. The air conditioner 3 is an air conditioning device that, for example, adjusts the temperature of the air and is a network device that locates in the sub-domain 10c and includes communication means. The number of PCs, the number of air conditioners and areas that these devices locate are not limited to those illustrated in FIG. 1 and other network devices such as television sets, facsimiles and the like that include communication means may be included in the respective sub-domains.

The portable terminals 4a to 4f are, for example, portable terminals such as cell phones that respective users, who use the PCs 2a to 2c, the air conditioner 3 and the like, carry. The portable terminals 4a to 4f are network devices that arbitrarily locate in one of the sub-domains 10a to 10c and include communication means. In the example illustrated in FIG. 1, a user who carries the portable terminal 4a may use the PC 2a, a user who carries the portable terminal 4b may use the PC 2b, and users who carry the portable terminals 4a to 4f may use the PC 2c and the air conditioner 3. The number of portable terminals and the location areas thereof are not limited to those illustrated in FIG. 1 and users who carry the portable terminals freely move from one sub-domain to another sub-domain among the sub-domains 10a to 10c.

The usage management system 100 is a communication apparatus such as, for example, a home gateway (HGW), a broadband router (BBR) or the like. The usage management system 100 stores information (usage restriction information) regarding usage restrictions of the PCs 2a to 2c, the air conditioner 3 and the like, for example, in correspondence with communication areas of the relay apparatuses 1a to 1c and/or in correspondence with users who use the portable terminals 4a to 4f, and controls operations of the respective network devices in accordance with the usage restriction information regarding these devices. In addition, the usage management system 100 may have a function of communicating with another device via a communication network 20 such as Internet and the like, acquiring contents via the communication network 20 and providing a user with the acquired contents, for example, when a URL is acquired in one of the PCs 2a to 2c or when the user intends to watch television.

Functional Configuration of Usage Management System According to First Embodiment FIG. 2 illustrates an exemplary functional configuration of a usage management system according to the present embodiment. An example of a functional configuration of a usage management system according to the present embodiment will be discussed with reference to FIG. 2. The usage management system 100 is, for example, a communication apparatus such as an HGW, a BBR or the like and includes a storage unit 110 and a control unit 120 as illustrated in FIG. 2.

The storage unit 110 stores data used by the control unit 120 in various processing and results of the various processing executed by the control unit 120. The storage unit 110 includes a usage restriction storage unit 111. The storage unit 110 is, for example, a semiconductor memory device such as a random access memory (RAM), a read-only memory (ROM), a flash memory or the like, or a storage device such as a hard disk, an optical disk or the like.

The usage restriction storage unit 111 stores usage restriction information regarding respective network devices that locate in respective areas in correspondence with users who use the network devices that include network-connectable communication means and in correspondence with location areas of the network devices. Each piece of information stored in the usage restriction storage unit 111 may be registered in advance by a user or another person in charge and may be arbitrarily updated.

FIG. 3 illustrates an example of usage restriction information stored in the usage restriction storage unit 111 according to the present embodiment. The usage restriction information stored in the usage restriction storage unit 111 according to the present embodiment will be discussed with reference to FIG. 3. As illustrated in FIG. 3, for example, the usage restriction storage unit 111 stores a "USER" item indicating a name of a user who uses a network device and a "USER IDENTIFYING TERMINAL" item indicating an identifier, such as a media access control (MAC) address, of a portable terminal that the user carries, in correspondence with each other. In addition, the usage restriction storage unit 111 also stores a "SITE ACCESS" item indicating a usage restriction of a network device in a sub-domain (denoted by "S-D" in the drawings) that the network device locates, in correspondence with the "USER" item and the "USER IDENTIFYING TERMINAL" item. The term ("N-R" or the like) in each "SITE ACCESS" item in FIG. 3 indicates, for example, restriction in Internet access made from each of the PCs 2a to 2c that locate in the respective sub-domains 10a to 10c. The usage restrictions of the network devices also include usage restrictions of other network devices such as the television set and the like in addition to the usage restrictions of the PCs 2a to 2c.

In a specific example, the usage restriction storage unit 111 stores "Yoshio (Father)" in the "USER" item, "MAC ADDRESS (TERMINAL 4c)" in the "USER IDENTIFYING TERMINAL" item, and "non-restricted" (denoted by "N-R" in the drawings) in a "SITE ACCESS (sub-domain 10a)" item, in correspondence with one another. The usage restriction storage unit 111 also stores "Yoshio (Father)" in the "USER" item, "MAC ADDRESS (TERMINAL 4c)" in the "USER IDENTIFYING TERMINAL" item, and "non-restricted" in a "SITE ACCESS (sub-domain 10b)" item, in correspondence with one another. The usage restriction storage unit 111 further stores "Yoshio (Father)" in the "USER" item, "MAC ADDRESS (TERMINAL 4c)" in the "USER IDENTIFYING TERMINAL" item, and "non-restricted" in a "SITE ACCESS (sub-domain 10c)" item, in correspondence with one another.

In another specific example, the usage restriction storage unit 111 stores "Yoshiko (Mother)" in the "USER" item, "MAC ADDRESS (TERMINAL 4d)" in the "USER IDENTIFYING TERMINAL" item, and "non-restricted" in the "SITE ACCESS (sub-domain 10a)" item, in correspondence with one another. The usage restriction storage unit 111 also stores "Yoshiko (Mother)" in the "USER" item, "MAC ADDRESS (TERMINAL 4d)" in the "USER IDENTIFYING TERMINAL" item, and "non-restricted" in the "SITE ACCESS (sub-domain 10b)" item, in correspondence with one another. The usage restriction storage unit 111 further stores "Yoshiko (Mother)" in the "USER" item, "MAC ADDRESS (TERMINAL 4d)" in the "USER IDENTIFYING TERMINAL" item, and "non-restricted" in the "SITE ACCESS (sub-domain 10c)" item, in correspondence with one another.

In another specific example, the usage restriction storage unit 111 stores "Taro (Elder Brother)" in the "USER" item, "MAC ADDRESS (TERMINAL 4b)" in the "USER IDENTIFYING TERMINAL" item, and "non-restricted" in the "SITE ACCESS (sub-domain 10a)" item, in correspondence with one another. The usage restriction storage unit 111 also stores "Taro (Elder Brother)" in the "USER" item, "MAC ADDRESS (TERMINAL 4b)" in the "USER IDENTIFYING TERMINAL" item, and "non-restricted" in the "SITE ACCESS (sub-domain 10b)" item, in correspondence with one another. The usage restriction storage unit 111 further stores "Taro (Elder Brother)" in the "USER" item, "MAC ADDRESS (TERMINAL 4b)" in the "USER IDENTIFYING TERMINAL" item, and "non-restricted" in the "SITE ACCESS (sub-domain 10c)" item, in correspondence with one another.

In another specific example, the usage restriction storage unit 111 stores "Hanako (Elder Sister)" in the "USER" item, "MAC ADDRESS (TERMINAL 4e)" in the "USER IDENTIFYING TERMINAL" item, and "R-15 rated" (denoted by "R-15" in the drawings) in the "SITE ACCESS (sub-domain 10a)" item, in correspondence with one another. The usage restriction storage unit 111 also stores "Hanako (Elder Sister)" in the "USER" item, "MAC ADDRESS (TERMINAL 4e)" in the "USER IDENTIFYING TERMINAL" item, and "R-15 rated" in the "SITE ACCESS (sub-domain 10b)" item, in correspondence with one another. The usage restriction storage unit 111 further stores "Hanako (Elder Sister)" in the "USER" item, "MAC ADDRESS (TERMINAL 4e)" in the "USER IDENTIFYING TERMINAL" item, and "non-restricted" in the "SITE ACCESS (sub-domain 10c)" item, in correspondence with one another.

In another specific example, the usage restriction storage unit 111 stores "Takuro (Younger Brother)" in the "USER" item, "MAC ADDRESS (TERMINAL 4a)" in the "USER IDENTIFYING TERMINAL" item, and "R-15 rated" (denoted by "R-15" in the drawings) in the "SITE ACCESS (sub-domain 10a)" item, in correspondence with one another. The usage restriction storage unit 111 also stores "Takuro (Younger Brother)" in the "USER" item, "MAC ADDRESS (TERMINAL 4a)" in the "USER IDENTIFYING TERMINAL" item, and "R-15 rated" in the "SITE ACCESS (sub-domain 10b)" item, in correspondence with one another. The usage restriction storage unit 111 further stores "Takuro (Younger Brother)" in the "USER" item, "MAC ADDRESS (TERMINAL 4a)" in the "USER IDENTIFYING TERMINAL" item, and "non-restricted" in the "SITE ACCESS (sub-domain 10c)" item, in correspondence with one another.

In another specific example, the usage restriction storage unit 111 stores "Hinako (Younger Sister)" in the "USER" item, "MAC ADDRESS (TERMINAL 4f)" in the "USER IDENTIFYING TERMINAL" item, and "R-15 rated" (denoted by "R-15" in the drawings) in the "SITE ACCESS (sub-domain 10a)" item, in correspondence with one another. The usage restriction storage unit 111 also stores "Hinako (Younger Sister)" in the "USER" item, "MAC ADDRESS (TERMINAL 4f)" in the "USER IDENTIFYING TERMINAL" item, and "R-15 rated" in the "SITE ACCESS (sub-domain 10b)" item, in correspondence with one another. The usage restriction storage unit 111 further stores "Hinako (Younger Sister)" in the "USER" item, "MAC ADDRESS (TERMINAL 4f)" in the "USER IDENTIFYING TERMINAL" item, and "non-restricted" in the "SITE ACCESS (sub-domain 10c)" item, in correspondence with one another.

The usage restriction storage unit 111 also stores usage restriction information set for an unidentified user ("Unidentified User" which is denoted by "UNIDENTIFIED" in the drawings) who is not a user such as a member of a family as mentioned above. The unidentified user is a user who, for example, is not authorized to use a network device including communication means and is not registered in advance in the usage restriction storage unit 111 unlike a user who is a member of a family. Information regarding the unidentified user is stored in the usage restriction storage unit 111 in order to prevent a network device from being used by a user who is not authorized to use the network device.

For example, the usage restriction storage unit 111 stores "Unidentified User" in the "USER" item and "DENIED" in the "SITE ACCESS (sub-domain 10a)" item, in correspondence with each other. The usage restriction storage unit 111 also stores "Unidentified User" in the "USER" item and "DENIED" in the "SITE ACCESS (sub-domain 10*b*)" item, in correspondence with each other. The usage restriction storage unit 111 further stores "Unidentified User" in the "USER" item and "DENIED" in the "SITE ACCESS (sub-domain 10*c*)" item, in correspondence with each other.

The control unit 120 illustrated in FIG. 2. includes an internal memory that stores, for example, a control program, a program that defines procedures of various processing, and required data. The control unit 120 also includes an area identification unit 121 and an operation control unit 122. The control unit 120 is, for example, an integrated circuit such as an application specific integrated circuit (ASIC), a field programmable gate array (FPGA) or the like, or an electronic circuit such as a central processing unit (CPU), a micro processing unit (MPU) or the like.

When the area identification unit 121 controls operations of a network device including communication means, the area identification unit 121 identifies a location area of the network device and a user who is present in the identified location area. For example, when the PC 2*a* that locates in the sub-domain 10*a* is powered on, the area identification unit 121 receives a signal indicating that the PC 2*a* has been powered on from the PC 2*a* via the relay apparatus 1*a*.

In the above mentioned situation, the area identification unit 121 identifies the location area of the PC 2*a* as the area which is under the management of the relay apparatus 1*a* on the basis of an MAC address of the relay apparatus 1*a* that has relayed the signal. The area identification unit 121 also receives an MAC address of the portable terminal 4*a* from the portable terminal 4*a* via the relay apparatus 1*a*. Then, the area identification unit 121 identifies the location area of the portable terminal 4*a* as the area which is under the management of the relay apparatus 1*a* on the basis of the MAC address of the relay apparatus 1*a* that has relayed the MAC address of the portable terminal 4*a*. The area which is under the management of the relay apparatus 1*a* refers to the area of the sub-domain 10*a* illustrated in FIG. 1. Communication between the usage management system 100 and the portable terminal 4*a* via the relay apparatus 1*a* may be performed usually or in the case that a network device has been operated and the like. For example, the usage management system 100 transmits a request to the portable terminal 4*a* via the relay apparatus 1*a* usually or in the case that it has received a predetermined communication message from a network device so as to detect the portable terminal 4*a* that locates in the area of the sub-domain 10*a*. In addition, the usage management system 100 may identify a user getting in and out of each area by usually communicating with each portable terminal, for example. As discussed above, the area identification unit 121 of the usage management system 100 receives data from a network device via a relay apparatus corresponding to an area. In other words, the usage management system 100 identifies an area on the basis of an identifier (the MAC address in the present embodiment) of a relay apparatus. An area in which a network device locates may be identified depending on via which relay apparatus the identifier (the MAC address in the present embodiment) of the network device has been received.

The operation control unit 122 acquires, from the usage restriction storage unit 111, usage restriction information, for a user who is present in an area identified by the area identification unit 121, regarding a network device that locates in the area and controls operations of the network device in accordance with the acquired usage restriction information. For example, the operation control unit 122 acquires, for the user "Takuro" who is present in the area of the sub-domain 10*a* identified by the area identification unit 121, the usage restriction information "R-15 Rated" regarding the PC 2*a* from the usage restriction storage unit 111. Then, the operation control unit 122 controls operations of the PC 2*a* in accordance with the acquired usage restriction information "R-15 Rated". That is, in Internet access from the PC 2*a* the user of which is "Takuro", the operation control unit 122 interrupts the access when the access is made to a URL corresponding to "R-15 Rated". Specifically, the operation control unit 122 extracts a URL included in a packet received from the PC 2*a* via the relay apparatus 1*a* and refuses a request for access when the extracted URL conforms to the usage restriction information "R-15 Rated".

The present embodiment will be discussed in relation to the sub-domain 10*b* in FIG. 1. The area identification unit 121 of the usage management system 100 receives data including an MAC address which is an identifier of the portable terminal 4*b* from the portable terminal 4*b* via the relay apparatus 1*b*. The area identification unit 121 of the usage management system 100 also receives data including an identifier of the PC 2*b* via the relay apparatus 1*b*. Thus, the area identification unit 121 of the usage management system 100 may determine that the portable terminal 4*b* and the PC 2*b* belong to the sub-domain 10*b*. Then, the operation control unit 122 refers to the restriction conditions for the users illustrated in FIG. 3 with respect to the user "Taro" who corresponds to the portable terminal 4*b*. As illustrated in FIG. 3, usage restriction information for the user "Taro" in the sub-domain 10*b* is "non-restricted". Thus, the operation control unit 122 controls operations of the PC 2*b* in accordance with the usage restriction information "non-restricted" in Internet access from the PC 2*b*.

The present embodiment will be discussed in relation to the sub-domain 10*c* in FIG. 1. The area identification unit 121 of the usage management system 100 receives data that including MAC addresses which are identifiers of the portable terminals 4*c* to 4*f* from the portable terminals 4*c* to 4*f*, respectively, via the relay apparatus 1*c*. The area identification unit 121 of the usage management system 100 also receives data including an identifier of the PC 2*c* via the relay apparatus 1*c*. Thus, the area identification unit 121 of the usage management system 100 may determine that the portable terminals 4*c* to 4*f* and the PC 2*c* belong to the sub-domain 10*c*. Then, the operation control unit 122 refers to the restriction conditions for the users illustrated in FIG. 3 with respect to users corresponding to the portable terminals 4*c* to 4*f*. As illustrated in FIG. 3, usage restriction information for each user in the sub-domain 10*c* is "non-restricted". Thus, the operation control unit 122 controls operations of the PC 2*c* in accordance with the usage restriction information "non-restricted" in Internet access from the PC 2*c*.

The present embodiment in a case in which different usage restrictions are set for different users who are present in the sub-domain 10*c* will be discussed. In the case that a plurality of users are present in one sub-domain, for example, a usage restriction for a user with a stricter usage restriction is applied. Or, in the case that a plurality of users are present in one sub-domain, for example, a usage restriction for a user with a more lenient usage restriction is applied. That is, the operation control unit 122 controls operations of a network device in accordance with usage restriction determined on the basis of the priority orders of the users in the sub-domain 10*c*. For example, it is assumed that the priority order is gradually descended in order of "Yoshio", "Yoshiko", "Taro", "Hanako", "Takuro" and "Hinako", and information regarding the above priority orders may be stored in advance in the usage restriction storage unit 111. An example in which a usage restriction for a user with a stricter usage restriction is applied will be given under the above mentioned assumption. In the case that the user "Taro" with the usage restriction "non-restricted" and the user "Hanako" with the usage restriction "R-15 Rated" are present in the sub-domain 10c, the operation control unit 122 controls operations of a device in accordance with "R-15 Rated" for the user "Hanako" who is lower in the priority ordering and is stricter in the usage restriction. An example in which a usage restriction for a user for with a more lenient usage restriction is applied will be given. In the case that the priority order of the user "Taro" is the highest in the sub-domain 10c, the operation control unit 122 controls operations of a device in accordance with the usage restriction "non-restricted" for the user "Taro" who is higher in the priority ordering. As discussed above, for the case that a plurality of users are present in one sub-domain, which usage restriction is to be applied is set in advance depending on the situation. The priority orders may be set for the usage restrictions instead of for the users. As a result, a usage restriction which is stricter than others or a usage restriction which is more lenient than others is selected.

In the case that the area identification unit 121 has determined a user to be an unidentified user, the operation control unit 122 controls operations of a PC so as not to allow the user to use any function of the PC in accordance with the usage restriction "DENIED".

Operation Controlling Process According to First Embodiment

FIG. 4 illustrates an exemplary operation flow of an operation controlling process according to the present embodiment. The operation controlling process according to the present embodiment will be discussed with reference to FIG. 4.

In S101, the usage management system 100 waits for receiving a predetermined communication signal from a network device that locates in a certain sub-domain.

In S102, upon receiving the signal ("Yes" in S101), the usage management system 100 identifies the location area of the network device. An example of the predetermined communication signal is a signal indicating that a network device has been powered on. The location area of the network device may be identified on the basis of an MAC address or the like of a relay apparatus that relays the signal.

In S103, the usage management system 100 identifies the user who is present in the area on the basis of the MAC address or the like of the portable terminal that the user carries.

In S104, the usage management system 100 acquires the usage restriction information corresponding to the user who is present in the area from the usage restriction storage unit 111.

In S105, the usage management system 100 controls operations of the network device in accordance with the acquired usage restriction information.

In the case that plural kinds of usage restriction information have been acquired in S104, the usage management system 100 controls operations of the network device in S105, in accordance with the usage restriction information which is selected on the basis of the priority orders of the corresponding users.

Effects of First Embodiment

As discussed above, since the usage management system 100 controls operations of each network device in accordance with the usage restrictions, set for respective areas and respective users who use network devices, of the network devices in respective areas, it may become possible for the usage management system 100 to usefully restrict the usage of each network device. In addition, since the usage management system 100 identifies the user who is present in a certain area by communicating with the portable terminal that the user carries usually, it may become possible for the usage management system 100 to usefully restrict the usage of a network device that locates in the area and to control operations thereof for each user. In other words, since the usage management system 100 controls operations of a network device in accordance with the usage restrictions that the users arbitrarily determine and are set in correspondence with users and areas, it may become possible for the usage management system 100 to more usefully restrict the usage of the network device than in conventional techniques in which the usage restrictions are set only for devices.

Second Embodiment

In the first embodiment, the usage restriction for a user determined on the basis of the priority orders of users is applied when applying a usage restriction to a plurality of users. However, it may be also possible to apply the usage restriction on the basis of the priority orders of users regarding each device. In a second embodiment, a case in which the usage restriction is applied on the basis of the priority orders of users regarding each device will be discussed.

Functional Configuration of Usage Management System According to Second Embodiment FIG. 5 illustrates an exemplary functional configuration of a usage management system according to the present embodiment. An example of a functional configuration of a usage management system according to the present embodiment will be discussed with reference to FIG. 5. In the present embodiment, similar numerals are assigned to components similar to those of the usage management system 100 according to the first embodiment and discussion thereof will be omitted. A usage management system 200 is, for example, a communication apparatus such as an HGW, a BBR or the like and includes a storage unit 210 and a control unit 220 as illustrated in FIG. 5.

The storage unit 210 stores data used by the control unit 220 in various processing and results of the various processing executed by the control unit 220. The storage unit 210 includes a usage restriction storage unit 211 and a priority ordering pattern storage unit 212. The storage unit 210 is, for example, a semiconductor memory device such as an RAM, an ROM, a flash memory or the like, or a storage device such as a hard disk, an optical disk or the like.

The priority ordering pattern storage unit 212 stores, for each network device including network-connectable communication means, each pattern of priority ordering among users who are allowed to use the each network device. Each piece of information stored in the priority ordering pattern storage unit 212 may be registered in advance by each user and may be arbitrarily updated.

FIG. 6 illustrates an example of information stored in the priority ordering pattern storage unit 212 according to the present embodiment. The information stored in the priority ordering pattern storage unit 212 according to the present embodiment will be discussed with reference to FIG. 6. The priority ordering pattern storage unit 212 stores, for example, a "NETWORK DEVICE" item indicating an identifier of each network device including communication means and a "PRIORITY ORDERING PATTERN" item indicating each pattern of priority ordering among users using each network device in correspondence with each other, as illustrated in FIG. 6.

In a specific example, the priority ordering pattern storage unit 212 stores "MAC ADDRESS (PC 2c)" in the "NETWORK DEVICE" item and "2" in the "PRIORITY ORDERING PATTERN" item, in correspondence with each other. That is, the above information indicates that the pattern of the priority ordering among the users of the PC 2c corresponding to the MAC address is "2".

In another specific example, the priority ordering pattern storage unit 212 stores "MAC ADDRESS (TV)" in the "NETWORK DEVICE" item and "1" in the "PRIORITY ORDERING PATTERN" item, in correspondence with each other. That is, the above information indicates that the pattern of the priority ordering among the users of the TV corresponding to the MAC address is "1".

In another specific example, the priority ordering pattern storage unit 212 stores "MAC ADDRESS (AIR CONDITIONER 3)" in the "NETWORK DEVICE" item and "3" in the "PRIORITY ORDERING PATTERN" item, in correspondence with each other. That is, the above information indicates that the pattern of the priority ordering among the users of the air conditioner 3 corresponding to the MAC address is "3".

The usage restriction storage unit 211 stores the information that the usage restriction storage unit 111 according to the first embodiment stores and also stores the priority order corresponding to each user, who uses the network devices including the network-connectable communication means, in each pattern of the priority ordering. Each piece of information stored in the usage restriction storage unit 211 may be registered in advance by each user and may be arbitrarily updated.

FIG. 7 illustrates an example of usage restriction information stored in the usage restriction storage unit 211 according to the present embodiment. The usage restriction information stored in the usage restriction storage unit 211 according to the present embodiment will be discussed with reference to FIG. 7. Discussion of the information which is similar to that stored in the usage restriction storage unit 111 according to the first embodiment will be omitted here.

As illustrated in FIG. 7, the usage restriction storage unit 211 stores a "Priority ordering pattern 1" (denoted by "P.O.P. 1" in the drawings) item, a "Priority ordering pattern 2" (denoted by "P.O.P. 2" in the drawings) item and the like, each indicating the priority order in each of the patterns of priority ordering, in correspondence with the "USER" item. The number of the priority ordering patterns indicating the priority ordering among the users is not limited to two such as "Priority ordering pattern 1" and "Priority ordering pattern 2" and either three or more priority ordering patterns or a single priority ordering pattern may be stored.

In a specific example, the usage restriction storage unit 211 stores "Yoshio (Father)" in the "USER" item, "6" in the "Priority ordering pattern 1" item, and "1" in the "Priority ordering pattern 2" item, in correspondence with one another. In another specific example, the usage restriction storage unit 211 stores "Yoshiko (Mother)" in the "USER" item, "5" in the "Priority ordering pattern 1" item, and "2" in the "Priority ordering pattern 2" item, in correspondence with one another. In another specific example, the usage restriction storage unit 211 stores "Taro (Elder Brother)" in the "USER" item, "4" in the "Priority ordering pattern 1" item, and "3" in the "Priority ordering pattern 2" item, in correspondence with one another. In another specific example, the usage restriction storage unit 211 stores "Hanako (Elder Sister)" in the "USER" item, "3" in the "Priority ordering pattern 1" item, and "4" in the "Priority ordering pattern 2" item, in correspondence with one another. In another specific example, the usage restriction storage unit 211 stores "Takuro (Younger Brother)" in the "USER" item, "2" in the "Priority ordering pattern 1" item, and "5" in the "Priority ordering pattern 2" item, in correspondence with one another. In another specific example, the usage restriction storage unit 211 stores "Hinako (Younger Sister)" in the "USER" item, "1" in the "Priority ordering pattern 1" item, and "6" in the "Priority ordering pattern 2" item, in correspondence with one another. That is, in the example illustrated in FIG. 7, the user who is the highest in priority ordering in the pattern "Priority ordering pattern 1" among the users of the network device concerned is "Hinako (Younger Sister)". In the example illustrated in FIG. 7, the user who is the highest in priority ordering in the pattern "Priority ordering pattern 2" among the users of the network device concerned is "Yoshio (Father)".

The control unit 220 illustrated in FIG. 5 includes an internal memory that stores, for example, a control program, a program that defines procedures of various processing, and required data. The control unit 220 also includes the area identification unit 121 and an operation control unit 222. The control unit 220 is, for example, an integrated circuit such as an ASIC or an FPGA, or an electronic circuit such as a CPU or an MPU.

For example, when the PC 2c that locates in the sub-domain 10c is powered on, the area identification unit 121 receives a signal indicating that the PC 2c has been powered on from the PC 2c via the relay apparatus 1c. In the above mentioned situation, the area identification unit 121 identifies the location area of the PC 2c as the area which is under the management of the relay apparatus 1c on the basis of an MAC address of the relay apparatus 1c that has relayed the signal. Subsequently, the area identification unit 121 receives MAC addresses of the portable terminals 4c to 4f from the portable terminals 4c to 4f, respectively, via the relay apparatus 1c. Then, the area identification unit 121 identifies the location area of the portable terminals 4c to 4f as the area which is under the management of the relay apparatus 1c on the basis of the MAC address of the relay apparatus 1c that has relayed the MAC addresses of the portable terminals 4c to 4f. The area which is under the management of the relay apparatus 1c refers to the area of the sub-domain 10c illustrated in FIG. 1.

When the area identification unit 121 has determined that a plurality of users are present in an area, the operation control unit 222 acquires, from the priority ordering pattern storage unit 212, the priority ordering pattern corresponding to the network device that locates in the area identified by the area identification unit 121. In addition, the operation control unit 222 acquires, from the usage restriction storage unit 211, usage restriction information regarding the network device that locates in the area, for the user who is the highest in priority ordering in the acquired priority ordering pattern among the users who are present in the area identified by the area identification unit 121. The operation control unit 222 controls operations of the network device in accordance with the acquired usage restriction information.

For example, the operation control unit 222 acquires, from the priority ordering pattern storage unit 212, the priority ordering pattern "2" corresponding to the PC 2c that locates in the sub-domain 10c identified by the area identification unit 121. Then, the operation control unit 222 determines the user "Yoshio" who is the highest in priority ordering in the acquired priority ordering pattern "2" among the users who are present in the area identified by the area identification unit 121. The operation control unit 222 acquires, from the usage restriction storage unit 211, the usage restriction information "non-restricted", for the user "Yoshio", regarding the PC 2c that locates in the area in the sub-domain 10c and controls operations of the PC 2c in accordance with the acquired usage restriction information "non-restricted".

Operation Controlling Process According to Second Embodiment

Figure 8:
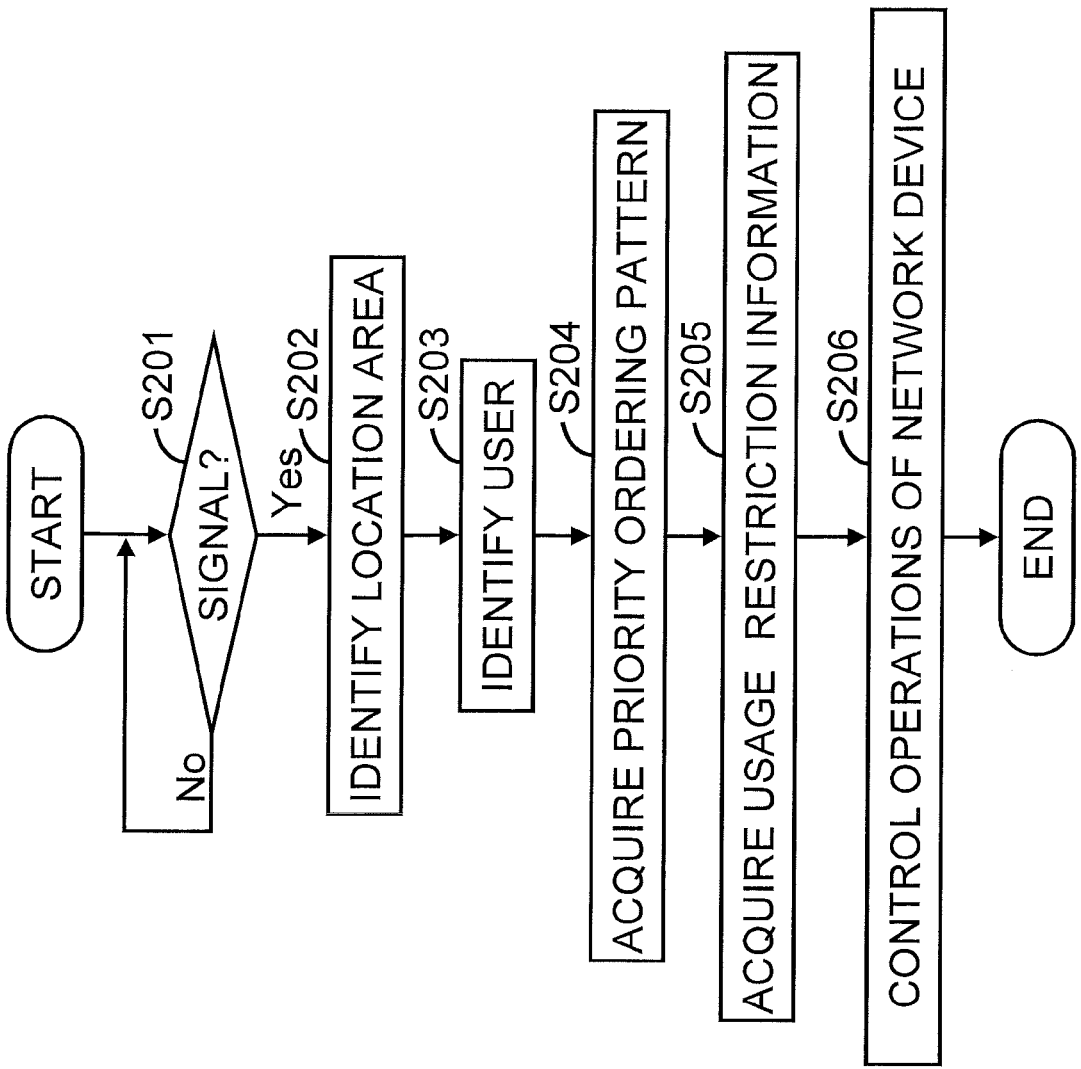
FIG. 8 is a diagram illustrating an exemplary operation flow of an operation controlling process according to an embodiment of the present invention.

FIG. 8 illustrates an exemplary operation flow of an operation controlling process according to the present embodiment. The operation controlling process according to the present embodiment will be discussed with reference to FIG. 8.

In S201, the usage management system 200 waits for receiving a predetermined communication signal from a network device that locates in a certain sub-domain.

In S202, upon receiving the signal ("Yes" in S201), the usage management system 200 identifies the location area of the network device.

In S203, the usage management system 200 identifies the users who are present in the area on the basis of the MAC addresses or the like of the portable terminals that the users carry.

In S204, the usage management system 200 acquires, from the priority ordering pattern storage unit 212, a priority ordering pattern corresponding to a network device that locates in the area.

In S205, the usage management system 200 determines a user who is the highest in priority ordering in the acquired priority ordering pattern among the users who are present in the identified area and acquires, from the usage restriction storage unit 211, the usage restriction information corresponding to the determined user.

In S206, the usage management system 200 controls operations of the network device in accordance with the acquired user restriction information.

Effects of Second Embodiment

As discussed above, the usage management system 200 controls operations of a network device in accordance with the usage restriction of a user who is the highest in priority ordering among the users who use the network device when a plurality of users use a network device that locates in a certain area. As a result, it may become possible for the usage management system 200 to usefully restrict the usage of the network device among the users who use the network device.

Third Embodiment

The usage restriction is applied to one or more users in the first and second embodiments. Alternatively, the usage restriction may be applied on the basis of a type of users. In a third embodiment, a case in which the usage restriction is applied on the basis of a type of users will be discussed.

Figure 9:
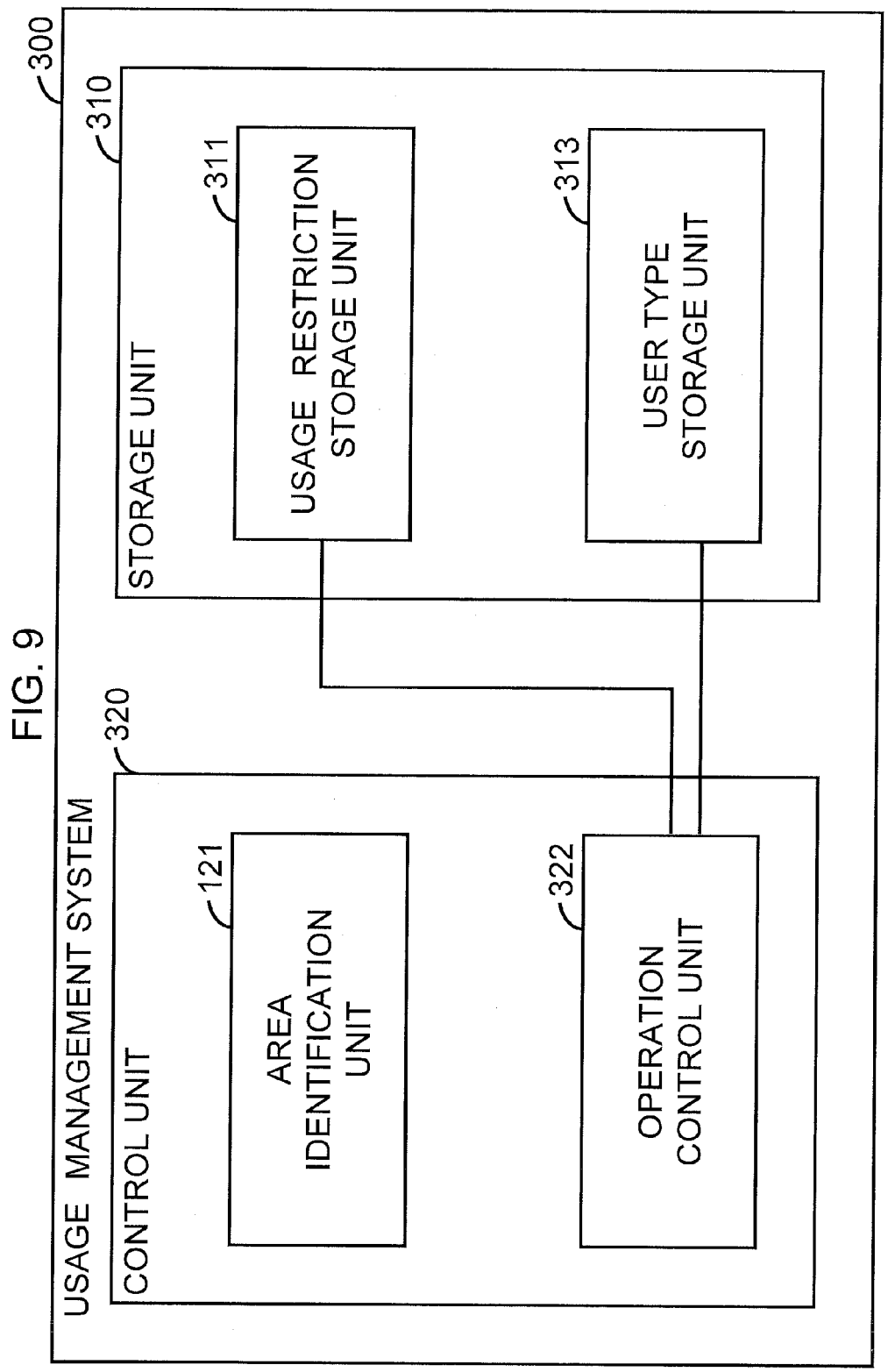
FIG. 9 is a diagram illustrating an exemplary functional configuration of a usage management system according to an embodiment of the present invention.

Functional Configuration of Usage Management System According to Third Embodiment FIG. 9 illustrates an exemplary functional configuration of a usage management system according to the present embodiment. An example of a functional configuration of a usage management system according to the present embodiment will be discussed with reference to FIG. 9. In the present embodiment, similar numerals are assigned to components similar to those of the usage management system 100 according to the first embodiment and discussion thereof will be omitted. A usage management system 300 is, for example, a communication apparatus such as an HGW, a BBR or the like and includes a storage unit 310 and a control unit 320 as illustrated in FIG. 9.

The storage unit 310 stores data used by the control unit 320 in various processing and results of the various processing executed by the control unit 320. The storage unit 310 includes a usage restriction storage unit 311 and a user type storage unit 313. The storage unit 310 is, for example, a semiconductor memory device such as an RAM, an ROM, a flash memory or the like, or a storage device such as a hard disk, an optical disk or the like.

The usage restriction storage unit 311 stores the information that the usage restriction storage unit 111 according to the first embodiment stores and also stores information regarding the gender and the age of each user in correspondence with each user who uses each network device including network-connectable communication means. Each piece of information stored in the usage restriction storage unit 311 may be registered in advance by each user and may be arbitrarily updated.

FIG. 10 illustrates an example of usage restriction information stored in the usage restriction storage unit 311 according to the present embodiment. The usage restriction information stored in the usage restriction storage unit 311 according to the present embodiment will be discussed with reference to FIG. 10. Discussion of the information which is similar to that stored in the usage restriction storage unit 111 according to the first embodiment will be omitted here.

As illustrated in FIG. 10, the usage restriction storage unit 311 stores a "GENDER" item indicating the gender of each user, an "AGE" item indicating the age of each user, and a "BIRTHDAY" item indicating the date of the birth of each user, in correspondence with the "USER" item.

In a specific example, the usage restriction storage unit 311 stores "Yoshio (Father)" in the "USER" item, "MALE" in the "GENDER" item, "42" in the "AGE" item, and "1967XXXX" in the "BIRTHDAY" item, in correspondence with one another. In another specific example, the usage restriction storage unit 311 stores "Yoshiko (Mother)" in the "USER" item, "FEMALE" in the "GENDER" item, "38" in the "AGE" item, and "1971XXXX" in the "BIRTHDAY" item, in correspondence with one another. In another specific example, the usage restriction storage unit 311 stores "Taro (Elder Brother)" in the "USER" item, "MALE" in the "GENDER" item, "16" in the "AGE" item, and "1993XXXX" in the "BIRTHDAY" item, in correspondence with one another.

In another specific example, the usage restriction storage unit 311 stores "Hanako (Elder Sister)" in the "USER" item, "FEMALE" in the "GENDER" item, "14" in the "AGE" item and "1995XXXX" in the "BIRTHDAY" item, in correspondence with one another. In another specific example, the usage restriction storage unit 311 stores "Takuro (Younger Brother)" in the "USER" item, "MALE" in the "GENDER" item, "12" in the "AGE" item, and "1997XXXX" in the "BIRTHDAY" item, in correspondence with one another. In another specific example, the usage restriction storage unit 311 stores "Hinako (Younger Sister)" in the "USER" item, "FEMALE" in the "GENDER" item, "10" in the "AGE" item, and "1999XXXX" in the "BIRTHDAY" item, in correspondence with one another. The age of each user is updated whenever a new birthday comes by counting the date using a clock which is built in the usage management system 300.

The user type storage unit 313 stores usage restriction information, for each area, regarding respective network devices that locate in respective areas and a user type indicating a group of users who use each network device including communication means, in correspondence with one another.

Each piece of information stored in the user type storage unit 313 may be registered in advance by each user and may be arbitrarily updated.

FIG. 11 illustrates an example of information stored in the user type storage unit 313 according to the present embodiment. The information stored in the user type storage unit 313 according to the present embodiment will be discussed with reference to FIG. 11.

As illustrated in FIG. 11, for example, the user type storage unit 313 stores a "USER TYPE" item indicating a group of users who use each network device, an "DEVICE SETTING" item indicating usage restriction of each network device that locates in each area, and the "SITE ACCESS" item, in correspondence with one another. The usage restrictions are set for network devices such as PCs and air conditioners and also set for other network devices such as television sets and others.

In a specific example, the user type storage unit 313 stores "MALE ONLY" in the "USER TYPE" item and "setting temperature 22° C. for an air conditioner" (denoted by "AC 22° C." in the drawings) in an "DEVICE SETTING (sub-domain 10a)" item, in correspondence with each other. The user type storage unit 313 also stores "MALE ONLY" in the "USER TYPE" item and "setting temperature 22° C. for an air conditioner" in a "DEVICE SETTING (sub-domain 10b)" item, in correspondence with each other. The user type storage unit 313 further stores "MALE ONLY" in the "USER TYPE" item and "setting temperature 22° C. for an air conditioner" in a "DEVICE SETTING (sub-domain 10c)" item, in correspondence with each other. In addition, the user type storage unit 313 stores "MALE ONLY" in the "USER TYPE" item and "non-restricted" in the "SITE ACCESS (sub-domain 10a)" item, that is, from the PC 2a, in correspondence with each other. The user type storage unit 313 also stores "MALE ONLY" in the "USER TYPE" item and "non-restricted" in the "SITE ACCESS (sub-domain 10b)" item, that is, from the PC 2b, in correspondence with each other. The user type storage unit 313 further stores "MALE ONLY" in the "USER TYPE" item and "non-restricted" in the "SITE ACCESS (sub-domain 10c)" item, that is, from the PC 2c, in correspondence with each other.

In another specific example, the user type storage unit 313 stores "FEMALE ONLY" in the "USER TYPE" item and "setting temperature 28° C. for an air conditioner" (denoted by "AC 28° C." in the drawings) in the "DEVICE SETTING (sub-domain 10a)" item, in correspondence with each other. The user type storage unit 313 also stores "FEMALE ONLY" in the "USER TYPE" item and "setting temperature 28° C. for an air conditioner" in the "DEVICE SETTING (sub-domain 10b)" item, in correspondence with each other. The user type storage unit 313 further stores "FEMALE ONLY" in the "USER TYPE" item and "setting temperature 28° C. for an air conditioner" in the "DEVICE SETTING (sub-domain 10c)" item, in correspondence with each other. In addition, the user type storage unit 313 stores "FEMALE ONLY" in the "USER TYPE" item and "non-restricted" in the "SITE ACCESS (sub-domain 10a)" item, that is, from the PC 2a, in correspondence with each other. The user type storage unit 313 also stores "FEMALE ONLY" in the "USER TYPE" item and "non-restricted" in the "SITE ACCESS (sub-domain 10b)" item, that is, from the PC 2b, in correspondence with each other. The user type storage unit 313 further stores "FEMALE ONLY" in the "USER TYPE" item and "non-restricted" in the "SITE ACCESS (sub-domain 10c)" item, that is, from the PC 2c, in correspondence with each other.

In another specific example, the user type storage unit 313 stores "ADULT ONLY" in the "USER TYPE" item and "NO POLICY" in the "DEVICE SETTING (sub-domain 10a)" item, in correspondence with each other. The user type storage unit 313 also stores "ADULT ONLY" in the "USER TYPE" item and "NO POLICY" in the "DEVICE SETTING (sub-domain 10b)" item, in correspondence with each other. The user type storage unit 313 further stores "ADULT ONLY" in the "USER TYPE" item and "NO POLICY" in the "DEVICE SETTING (sub-domain 10c)" item, in correspondence with each other. In addition, the user type storage unit 313 stores "ADULT ONLY" in the "USER TYPE" item and "non-restricted" in the "SITE ACCESS (sub-domain 10a)" item, that is, from the PC 2a, in correspondence with each other. The user type storage unit 313 also stores "ADULT ONLY" in the "USER TYPE" item and "non-restricted" in the "SITE ACCESS (sub-domain 10b)" item, that is, from the PC 2b, in correspondence with each other. The user type storage unit 313 further stores "ADULT ONLY" in the "USER TYPE" item and "non-restricted" in the "SITE ACCESS (sub-domain 10c)" item, that is, from the PC 2c, each other.

In another specific example, the user type storage unit 313 stores "CHILD ONLY" in the "USER TYPE" item and "power off for an air conditioner" (denoted by "AC OFF" in the drawings) in the "DEVICE SETTING (sub-domain 10a)" item, in correspondence with each other. The user type storage unit 313 also stores "CHILD ONLY" in the "USER TYPE" item and "power off for an air conditioner" in the "DEVICE SETTING (sub-domain 10b)" item, in correspondence with each other. The user type storage unit 313 further stores "CHILD ONLY" in the "USER TYPE" item and "power off for an air conditioner" in the "DEVICE SETTING (sub-domain 10c)" item, in correspondence with each other. In addition, the user type storage unit 313 stores "CHILD ONLY" in the "USER TYPE" item and "R-15 Rated" in the "SITE ACCESS (sub-domain 10a)" item, that is, from the PC 2a, in correspondence with each other. The user type storage unit 313 also stores "CHILD ONLY" in the "USER TYPE" item and "R-15 Rated" in the "SITE ACCESS (sub-domain 10b)" item, that is, from the PC 2b, in correspondence with each other. The user type storage unit 313 further stores "CHILD ONLY" in the "USER TYPE" item and "R-15 Rated" in the "SITE ACCESS (sub-domain 10c)" item, that is, from the PC 2c, in correspondence with each other.

In another specific example, the user type storage unit 313 stores "MIXED" in the "USER TYPE" item and "NO POLICY" in the "DEVICE SETTING (sub-domain 10a)" item, in correspondence with each other. The user type storage unit 313 also stores "MIXED" in the "USER TYPE" item and "NO POLICY" in the "DEVICE SETTING (sub-domain 10b)" item, in correspondence with each other. The user type storage unit 313 further stores "MIXED" in the "USER TYPE" item and "NO POLICY" in the "DEVICE SETTING (sub-domain 10c)" item, in correspondence with each other. In addition, the user type storage unit 313 stores "MIXED" in the "USER TYPE" item and "non-restricted" in the "SITE ACCESS (sub-domain 10a)" item, that is, from the PC 2a, in correspondence with each other. The user type storage unit 313 also stores "MIXED" in the "USER TYPE" item and "non-restricted" in the "SITE ACCESS (sub-domain 10b)" item, that is, from the PC 2b, in correspondence with each other. The user type storage unit 313 further stores "MIXED" in the "USER TYPE" item and "non-restricted" in the "SITE ACCESS (sub-domain 10c)" item, that is, from the PC 2c, in correspondence with each other. "MIXED" stored in the "USER TYPE" item refers to, for example, a state in which males and females are present together and a state in which adults and children are present together. Hence, there exist plural states of "MIXED".

The control unit 320 illustrated in FIG. 9 includes an internal memory that stores, for example, a control program, a program that defines procedures of various processing and required data. The control unit 320 also includes the area identification unit 121 and an operation control unit 322. The control unit 320 is, for example, an integrated circuit such as an ASIC or an FPGA, or an electronic circuit such as a CPU or an MPU.

For example, when the air conditioner 3 that locates in the sub-domain 10c is powered on, the area identification unit 121 receives a signal indicating that the air conditioner 3 has been powered on from the air conditioner 3 via the relay apparatus 1c. In the above mentioned situation, the area identification unit 121 identifies the location area of the air conditioner 3 as the area which is under the management of the relay apparatus 1c on the basis of an MAC address of the relay apparatus is that has relayed the signal. Subsequently, the area identification unit 121 receives the MAC addresses of the portable terminals 4c to 4f from the portable terminals 4c to 4f, respectively, via the relay apparatus 1c. Then, the area identification unit 121 identifies the location area of the portable terminals 4c to 4f as the area which is under the management of the relay apparatus is on the basis of the MAC address of the relay apparatus is that has relayed the MAC addresses of the portable terminals 4c to 4f. The area which is under the management of the relay apparatus 1c refers to the area of the sub-domain 10c illustrated in FIG. 1.

The operation control unit 322 acquires, from the usage restriction storage unit 311, information regarding the gender and the age of respective users who are present in the area identified by the area identification unit 121. The operation control unit 322 determines the user type on the basis of the acquired information regarding the gender and the age of the respective users. The operation control unit 322 acquires, from the user type storage unit 313, the usage restriction information, for the determined user type, regarding a network device that locates in the identified area to control operations of the network device in accordance with the acquired usage restriction information.

For example, the operation control unit 322 acquires, from the usage restriction storage unit 311, information regarding the gender and the age of each user who is present in the area of the sub-domain 10c identified by the area identification unit 121. The information regarding the gender and the age of the user to be acquired are, for example, the gender "MALE" and the age "42" of the user "Yoshio". The information regarding the gender and the age of the user to be acquired are, for example, the gender "FEMALE" and the age "38" of the user "Yoshiko". The information regarding the gender and the age of the user to be acquired are, for example, the gender "FEMALE" and the age "14" of the user "Hanako". The information regarding the gender and the age of the user to be acquired are, for example, the gender "FEMALE" and the age "10" of the user "Hinako".

Then, the operation control unit 322 determines the user type "MIXED" on the basis of the acquired information regarding the gender and the age of the respective users. The operation control unit 322 acquires, from the user type storage unit 313, the usage restriction information "NO POLICY" of the air conditioner 3 that locates in the area of the sub-domain 10c, corresponding to the determined user type "MIXED". Then, the operation control unit 322 controls operations of the air conditioner 3 in accordance with the acquired usage restriction information "NO POLICY".

Operation Controlling Process According to Third Embodiment

FIG. 12 illustrates an exemplary operation flow of an operation controlling process according to the present embodiment. The operation controlling process according to the present embodiment will be discussed with reference to FIG. 12.

In S301, the usage management system 300 waits for receiving a predetermined communication signal from a network device that locates in a certain sub-domain.

In S302, upon receiving the signal ("Yes" in S301), the usage management system 300 identifies the location area of the network device.

In S303, the usage management system 300 identifies the users who are present in the area on the basis of the MAC addresses or the like of the portable terminals that the users carry.

In S304, the usage management system 300 acquires, from the usage restriction storage unit 311, information regarding the gender and age of each user who is present in the identified location area.

In S305, the usage management system 300 determines the user type on the basis of the acquired information regarding the gender and the age of each user.

In S306, the usage management system 300 acquires, from the user type storage unit 313, the usage restriction information of the network device that locates in the area, corresponding to the determined user type.

In S307, the usage management system 300 controls operations of the network device in accordance with the acquired usage restriction information.

Effects of Third Embodiment

As discussed above, since the usage management system 300 controls operations of a network device in accordance with the usage restriction corresponding to the type of users who use the network device that locates in a certain area, it may become possible for the usage management system 300 to usefully restrict the usage of the network device even when various types of users are present together in the area.

Fourth Embodiment

A user who is present in an area is identified when a network device in the area is controlled in the first to third embodiments. Alternatively, the user may be registered in advance in a storage unit at an arbitrary timing so as to control operations of the network device using the storage unit. In a fourth embodiment, a case in which a user is registered in advance in a storage unit at an arbitrary timing so as to control operations of a network device using the storage unit will be discussed. Since a usage management system according to the present embodiment includes some components, processes, and the like which are similar to those in the first to third embodiments, discussion thereof will be omitted.

Priority Ordering Pattern Storage Unit According to Fourth Embodiment

FIG. 13 illustrates an example of information stored in a priority ordering pattern storage unit according to the present embodiment. The information stored in the priority ordering pattern storage unit according to the present embodiment will be discussed with reference to FIG. 13.

The priority ordering pattern storage unit stores, for example, a "NETWORK DEVICE" item and the "USER" item in correspondence with each other. The "NETWORK DEVICE" item indicates an identifier of each portable terminal that each user carries or an identifier of each network device. The priority ordering pattern storage unit also stores the "NETWORK DEVICE" item and a "LOCATION AREA" item indicating a location area of each user or each network device, in correspondence with each other. The priority ordering pattern storage unit also stores the "NETWORK DEVICE" item, an "IP ADDRESS" item indicating an internet protocol (IP) address of each network device, and a "PRIVATE/SHARED" item indicating whether each network device is a terminal of private use or shared use, in correspondence with one another. The priority ordering pattern storage unit also stores the "NETWORK DEVICE" item, the "PRIORITY ORDERING PATTERN" item, a "GENDER TYPE" item indicating a gender of each user or a type relevant to the gender of each user, and an "ADULT/CHILD" item indicating whether each user is an adult or a child or indicating a type relevant to the age of each user, in correspondence with one another. The "NETWORK DEVICE" item, the "PRIVATE/SHARED" item and the "PRIORITY ORDERING PATTERN" item are set in advance in the priority ordering pattern storage unit and information other than the above is registered or deleted at a predetermined timing.

In a specific example, the priority ordering pattern storage unit stores "MAC ADDRESS (TERMINAL 4c)" in the "NETWORK DEVICE" item, "Yoshio" in the "USER" item, "MAC ADDRESS (RELAY 1c)" in the "LOCATION AREA" item, and "IP ADDRESS (TERMINAL 4c)" in the "IP ADDRESS" item, in correspondence with one another. In addition, the priority ordering pattern storage unit stores "MAC ADDRESS (TERMINAL 4c)" in the "NETWORK DEVICE" item, "PRIVATE" in the "PRIVATE/SHARED" item, "MALE" in the "GENDER TYPE" item, and "ADULT" in the "ADULT/CHILD" item, in correspondence with one another.

In another specific example, the priority ordering pattern storage unit stores "MAC ADDRESS (PC)" in the "NETWORK DEVICE" item, "Taro" in the "USER" item, "MAC ADDRESS (RELAY 1b)" in the "LOCATION AREA" item, and "IP ADDRESS (PC)" in the "IP ADDRESS" item, in correspondence with one another. In addition, the priority ordering pattern storage unit stores "MAC ADDRESS (PC)" in the "NETWORK DEVICE" item, "PRIVATE" in the "PRIVATE/SHARED" item, "MALE" in the "GENDER TYPE" item, and "CHILD" in the "ADULT/CHILD" item, in correspondence with one another.

In another specific example, the priority ordering pattern storage unit stores "MAC ADDRESS (Air Conditioner)" in the "NETWORK DEVICE" item, "Taro" in the "USER" item, "MAC ADDRESS (RELAY 1b)" in the "LOCATION AREA" item, and "IP Address (Air Conditioner)" in the "IP ADDRESS" item, in correspondence with one another. In addition, the priority ordering pattern storage unit stores "MAC ADDRESS (Air Conditioner)" in the "NETWORK DEVICE" item, "PRIVATE" in the "PRIVATE/SHARED" item, "2" in the "PRIORITY ORDERING PATTERN" item, "MALE ONLY" in the "GENDER TYPE" item, and "CHILD ONLY" in the "ADULT/CHILD" item, in correspondence with one another.

Usage Restriction Storage Unit According to Fourth Embodiment

FIG. 14 illustrates an example of usage restriction information stored in the usage restriction storage unit according to the present embodiment. The usage restriction information stored in the usage restriction storage unit according to the present embodiment will be discussed with reference to FIG. 14.

As illustrated in the example in FIG. 14, the usage restriction storage unit stores the "USER" item, the "Priority ordering pattern 1" item, the "Priority ordering pattern 2" item, the "GENDER" item, the "AGE" item, the "BIRTHDAY" item, and the "USER IDENTIFYING TERMINAL" item, in correspondence with one another. The usage restriction storage unit also stores the "SITE ACCESS (sub-domain 10a)" item, the "SITE ACCESS (sub-domain 10b)" item, and the "SITE ACCESS (sub-domain 10c)" item, in correspondence with the "USER" item and the "USER IDENTIFYING TERMINAL" item.

Terminal User Storage Unit According to Fourth Embodiment

Figure 15:
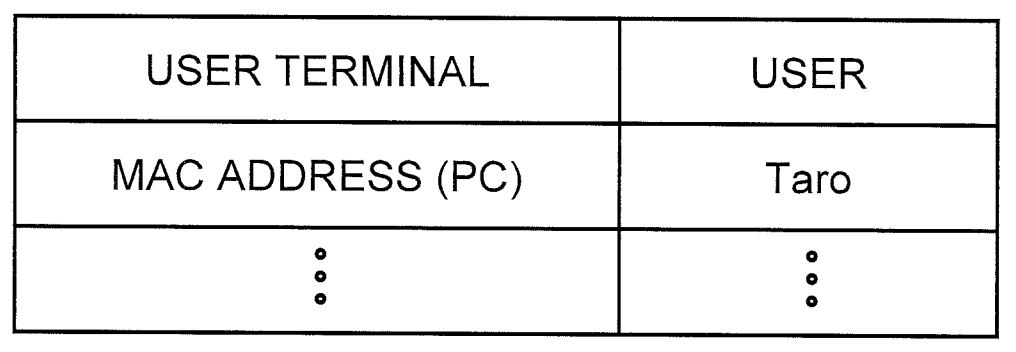

FIG. 15 illustrates an example of information stored in the terminal user storage unit according to the present embodiment. The information stored in the terminal user storage unit according to the present embodiment will be discussed with reference to FIG. 15.

As illustrated in FIG. 15, the terminal user storage unit stores, for example, a "USER TERMINAL" item indicating an identifier of each network device that each user uses in private and a "USER" item indicating the name of each user who uses each network device, in correspondence with each other. In a specific example, the terminal user storage unit stores "MAC ADDRESS (PC)" in the "USER TERMINAL" item and "Taro" in the "USER" item, in correspondence with each other. That is, only the user "Taro" is allowed to use the personal computer identified by "MAC ADDRESS (PC)" stored in the "USER TERMINAL" item. Since the user type storage unit according to the present embodiment is similar to the user type storage unit 313 according to the third embodiment, discussion thereof will be omitted.

Figure 16:
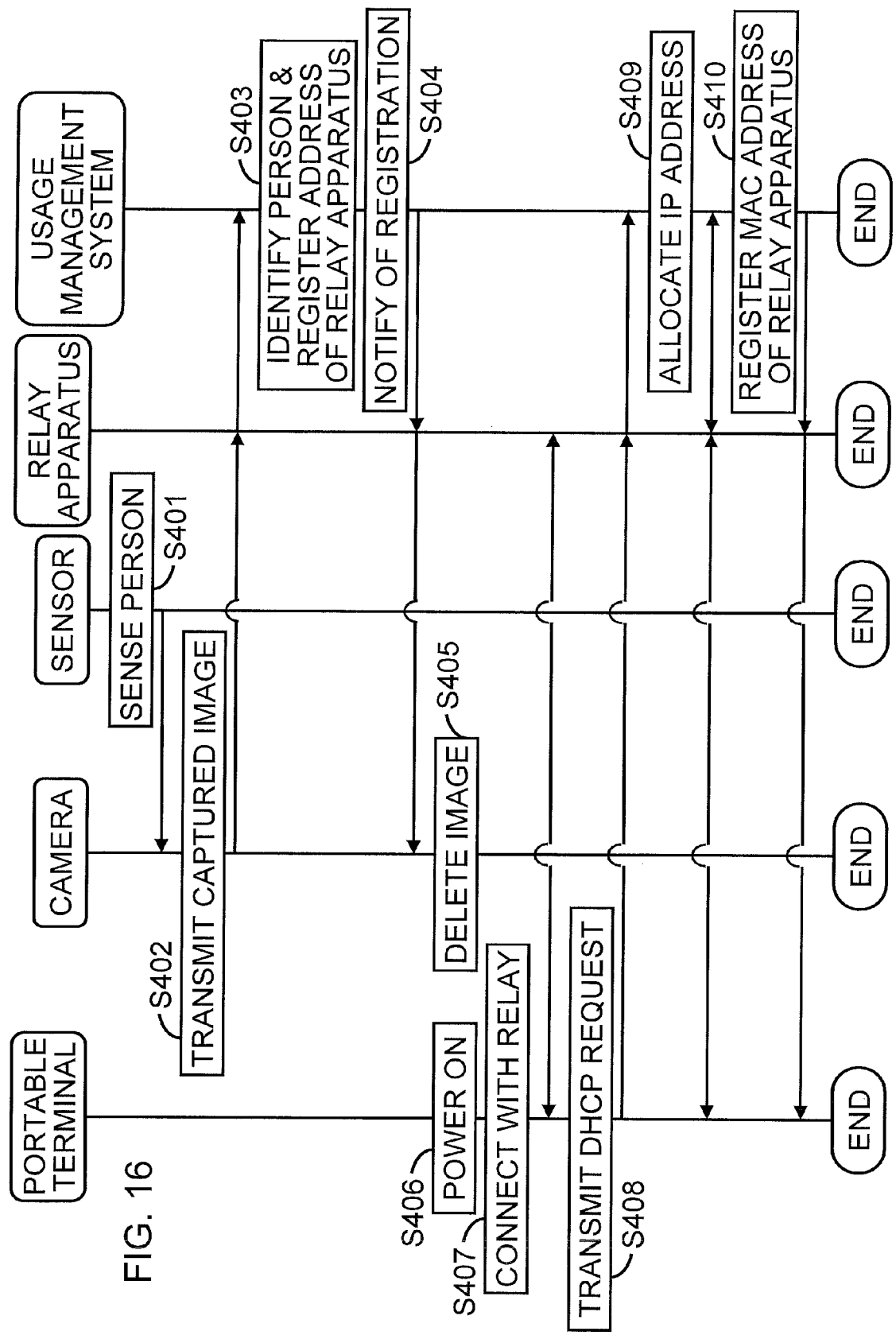
FIG. 16 is a diagram illustrating an exemplary operation sequence of a location registering process for a portable terminal according to an embodiment of the present invention.

Operation Sequence of Location Registering Process for Portable Terminal According to Fourth Embodiment FIG. 16 illustrates an exemplary operation sequence of a location registering process for a portable terminal according to the present embodiment. The location registering process for a portable terminal according to the present embodiment will be discussed with reference to FIG. 16. A sensor illustrated in FIG. 16 is disposed in each area, where each relay apparatus locates, to sense each person who is present in each area. A camera illustrated in FIG. 16 is also disposed in each area, where each relay apparatus locates, to capture an image of each person that the sensor has sensed and transmit image data of the captured image to the usage management system. That is, the sensor and the camera are disposed in each sub-domain. In addition, the usage management system also includes an image storage unit that stores information regarding each user who uses each network device and the image data of each user.

In S401, the sensor senses a person who is getting in an area and notifies the camera that the sensor has sensed the person.

In S402, the camera captures an image of the person that the sensor has sensed and transmits image data of the captured image to the usage management system.

In S403, the usage management system receives the image data from the camera, verifies the received image data with image data stored in the image storage unit to identify the person, and registers the MAC address of the relay apparatus in the location area of the identified person into the priority ordering pattern storage unit by regarding the identified person as the user. At this time, the usage management system registers a dummy MAC address and a dummy IP address of a tentative portable terminal for the identified person into the priority ordering pattern storage unit.

In S404, the usage management system notifies the camera that registration of the addresses into the priority ordering pattern storage unit has been completed.

In S405, upon receiving the notification, the camera deletes the image data of the captured image.

In S406, a portable terminal is powered on in response to a predetermined operation by a user who carries the portable terminal and has got in the area.

In S407, the portable terminal establishes a connection with the relay apparatus in the area by performing a verification of a wireless LAN or the like.

In S408, the portable terminal transmits a dynamic host configuration protocol (DHCP) request or the like to the usage management system to establish a connection with the usage management system.

In S409, upon receiving the DHCP request from the portable terminal, the usage management system allocates an IP address to the portable terminal.

In S410, the usage management system registers the MAC address of the relay apparatus into the priority ordering pattern storage unit in correspondence with the MAC address of the portable terminal. The usage management system searches the usage restriction storage unit to acquire information regarding the gender and the age of the user, and registers information regarding the gender and the adult/child into the priority ordering pattern storage unit.

In S406, the portable terminal may detect the relay apparatus in a usual communication or the like instead of the power on and then may establish a connection with the relay apparatus. As illustrated in FIG. 16, the camera and the portable terminal communicate with the usage management system via the relay apparatus.

Figure 17:
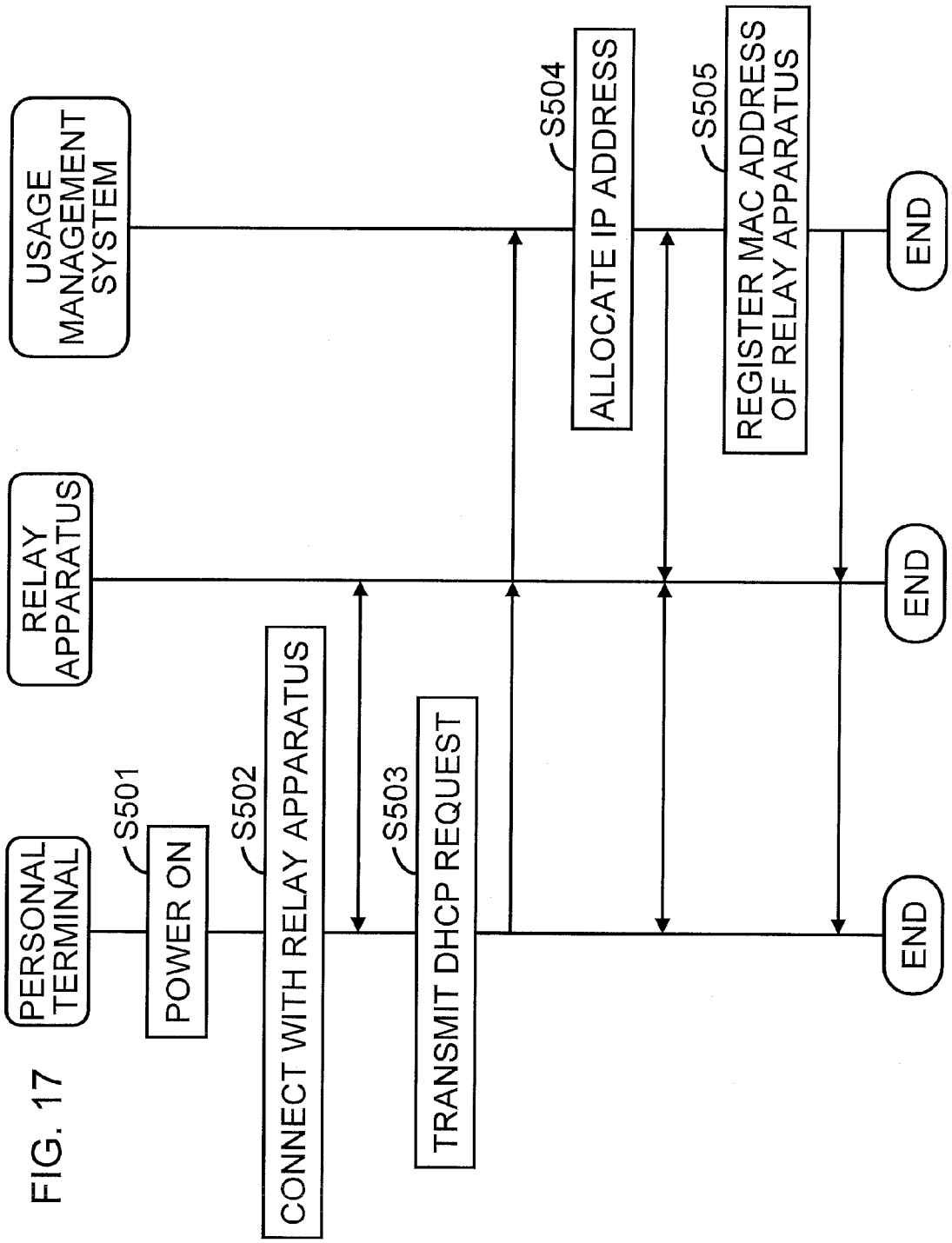
FIG. 17 is a diagram illustrating an exemplary operation sequence of a location registering process for a personal terminal according to an embodiment of the present invention.

Operation Sequence of Location Registering Process for Personal Terminal According to Fourth Embodiment FIG. 17 illustrates an exemplary operation sequence of a location registering process for a personal terminal according to the present embodiment. The location registering process for a personal terminal according to the present embodiment will be discussed with reference to FIG. 17. The personal terminal refers to a network device such as a personal computer, a television set or the like that a person exclusively uses in private. That is, the personal terminal is a network device that only a predetermined user is allowed to use.

In S501, the personal terminal is powered on in response to a predetermined operation by a user.

In S502, the personal terminal establishes a link via a wireless LAN or the like to connect with the relay apparatus.

In S503, the personal terminal transmits a DHCP request or the like to the usage management system to establish a connection with the usage management system.

In S504, upon receiving the DHCP request from the personal terminal, the usage management system allocates an IP address to the personal terminal.

In S505, the usage management system searches the terminal user storage unit to acquire information regarding the user. The usage management system searches the usage restriction storage unit to acquire information regarding the gender and the age of the user by using the acquired information regarding the user, and registers the information regarding the user, the gender, and the adult/child into the priority ordering pattern storage unit together with the MAC addresses of the personal terminal and the relay apparatus.

Operation Sequence of Location Registering Process for Shared Terminal According to Fourth Embodiment FIG. 18 illustrates an exemplary operation sequence of a location registering process for a shared terminal according to the present embodiment. The location registering process for a shared terminal according to the present embodiment will be discussed with reference to FIG. 18. The shared terminal refers to a network device such as a personal computer, a television set or the like that is shared and used by a plurality of users. That is, the shared terminal may be used by one person or by a plurality of users.

In S601, the shared terminal is powered on in response to a predetermined operation by a user.

In S602, the shared terminal establishes a link via a wireless LAN or the like to connect with the relay apparatus.

In S603, the shared terminal transmits a DHCP request or the like to the usage management system to establish a connection with the usage management system.

In S604, upon receiving the DHCP request from the shared terminal, the usage management system allocates an IP address to the shared terminal.

In S605, the usage management system registers the MAC address of the relay apparatus as the location area into the priority ordering pattern storage unit in correspondence with the MAC address of the shared terminal. The usage management system identifies users who are present in the same location area and acquires the priority ordering pattern of the shared terminal from the priority ordering pattern storage unit. The usage management system determines one user who is the highest in priority ordering in the acquired priority ordering pattern among the users who are present in the same location area and acquires, from the usage restriction storage unit, information regarding the gender and the age of the users who are present in the same location area. The usage management system determines the gender (or the type thereof) and the adult/child (or the type thereof) on the basis of the acquired information regarding the gender and the age of the users who are present in the same location area, and registers, into the priority ordering pattern storage unit, information regarding the determined gender, the adult/child, and the determined user who is the highest in priority ordering.

Figure 19A:
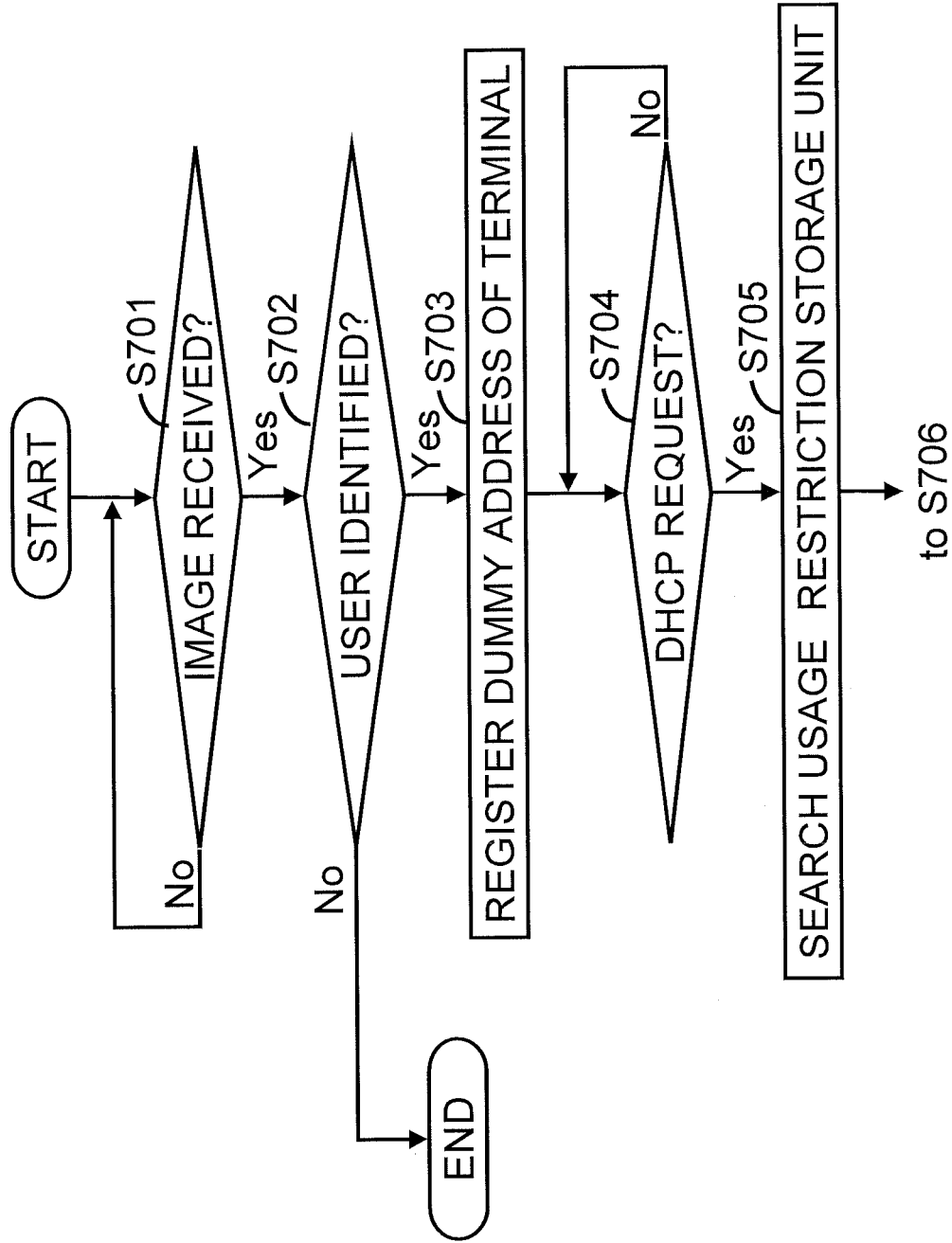

Location Registering Process of Usage Management System According to Fourth Embodiment FIGS. 19A and 19B illustrate an exemplary operation flow of a location registering process according to the present embodiment. The location registering process according to the present embodiment will be discussed with reference to FIGS. 19A and 19B.

In S701, the usage management system waits for receiving image data from the camera.

In S702, upon receiving image data from the camera ("Yes" in S701), the usage management system determines whether the user has been identified.

In S703, when the user has been identified by using the image storage unit ("Yes" in S702), the usage management system registers, into the priority ordering pattern storage unit, a dummy MAC address and a dummy IP address of a tentative portable terminal for the identified user.

When the user corresponding to the received image data is not stored in the image storage unit ("No" in S702), the usage management system terminates the process. The user who has not been identified is treated as an unidentified user.

In S704, the usage management system waits for receiving a DHCP request from the portable terminal.

In S705, upon receiving a DHCP request from the portable terminal ("Yes" in S704), the usage management system allocates an IP address to the portable terminal and acquires the MAC addresses of the portable terminal and a relay apparatus concerned. Then, the usage management system searches the usage restriction storage unit to acquire information regarding the user corresponding to the MAC address of the portable terminal.

In S706, upon accepting a communication from a network device, the usage management system determines whether the network device is a personal terminal by using the priority ordering pattern storage unit.

In S707, when the network device is a shared terminal ("No" in S706), the usage management system searches the priority ordering pattern storage unit for information regarding a priority ordering pattern corresponding to the MAC address of the portable terminal and users who are present in the area corresponding to the MAC address of the relay apparatus.

In S708, the usage management system searches the usage restriction storage unit for information regarding the priority order, the gender, and the age of respective users.

In S709, the usage management system selects one user who is the highest in priority ordering as the user of the network device on the basis of the acquired information regarding the priority orders of the users.

In S710, the usage management system determines the type ("GENDER TYPE") of gender and the type ("ADULT/CHILD") of age on the basis of the acquired information regarding the gender and the age of the users.

In S711, the usage management system determines whether information regarding the user concerned is registered in the priority ordering pattern storage unit. Information stored in the priority ordering pattern storage unit at that time point may include information that has been registered as dummy information.

In S712, when information regarding the user concerned is registered in the priority ordering pattern storage unit ("Yes" in S711), the usage management system updates data stored in the priority ordering pattern storage unit and terminates the process.

In S713, when information regarding the user concerned is not registered in the priority ordering pattern storage unit ("No" in S711), the usage management system discards the DHCP request and terminates the process. That is, when information regarding the user is not registered in the priority ordering pattern storage unit, there is high possibility that the user is an unidentified user or the portable terminal is fraudulently used.

In S714, when the network device is a personal terminal ("Yes" in S706), the usage management system determines whether the user has already been identified.

In S715, when the user has not yet been identified ("No" in S714), the usage management system determines the user on the basis of information stored in the terminal user storage unit and acquires information regarding the determined user from the usage restriction storage unit to update data stored in the priority ordering pattern storage unit. Thereafter, the usage management system terminates the process.

When the user has already been identified ("Yes" in S714), the usage management system terminates the process.

The usage management system that has executed the location registering process in the above mentioned manner controls operations of the network device in accordance with the usage restriction corresponding to the user who is the highest in priority ordering or the determined type in a similar manner to that in the first to third embodiments.

Location Deleting Process according to Fourth Embodiment

FIG. 20 illustrates an exemplary operation flow of a location deleting process according to the present embodiment. The location deleting process according to the present embodiment will be discussed with reference to FIG. 20.

In S801, the usage management system waits for receiving image data from the camera.

In S802, upon receiving image data from the camera ("Yes" in S801), the usage management system determines whether the user has been identified by using the image storage unit.

In S803, when the user has been identified ("Yes" in S802), the usage management system deletes information regarding the corresponding user from the priority ordering pattern storage unit.

When the user has not been identified ("No" in S802), the usage management system terminates the process.

In S804, the usage management system waits for update timeout of the DHCP for a portable terminal.

In S805, when the DHCP update for a portable terminal has been timed out with respect to a user registered in the priority ordering pattern storage unit ("Yes" in S804), the usage management system acquires the MAC address and the IP address of the corresponding portable terminal from a DHCP table. The usage management system searches the usage restriction storage unit by using the acquired MAC address of the portable terminal to determine the user.

In S806, the usage management system deletes, from the priority ordering pattern storage unit, information regarding all the network devices, corresponding to the determined user, that locate in the area where the DHCP update has been timed out.

Updating Process for Usage Restriction Information Regarding User Getting in and Out of Area According to Fourth Embodiment FIG. 21 illustrates an exemplary operation flow of an updating process for the usage restriction information executed when a user getting in and out of an area according to the present embodiment. The updating process for the usage restriction information executed when a user getting in and out of an area according to the present embodiment will be discussed with reference to FIG. 21.

In S901, the usage management system waits for receiving, together with the image data transmitted from the camera, a signal indicating that someone has got in or out of an area, transmitted in response to sensor detection.

In S902, upon receiving the signal ("Yes" in S901), the usage management system extracts the MAC address of the corresponding relay apparatus.

In S903, the usage management system searches the priority ordering pattern storage unit for information regarding the MAC address, the users, and the priority ordering pattern of a shared terminal by using the extracted MAC address.

In S904, the usage management system searches the usage restriction storage unit for information regarding the priority order, the gender, and the age of each of the plurality of users.

In S905, the usage management system selects, as the user of the network device, one user who is the highest in priority ordering among the plurality of users.

In S906, the usage management system determines the type ("GENDER TYPE") of gender and the type ("ADULT/CHILD") of age on the basis of the acquired information regarding the gender and the age of the users.

In S907, the usage management system determines whether the information regarding the selected user and the determined types matches the information stored in the priority ordering pattern storage unit.

In S908, when it does not match the registered information ("No" in S907), the usage management system updates data stored in the priority ordering pattern storage unit and terminates the process.

When it matches the registered information ("Yes" in S907), the usage management system terminates the process.

The usage management system that has updated information stored in the priority ordering pattern storage unit in the above mentioned manner controls operations of the network device in accordance with a new usage restriction in a similar manner to that in the first to third embodiments.

Effects of Fourth Embodiment

As discussed above, since the usage management system according to the present embodiment registers, into the storage units, user information and information regarding users of personal and shared terminals for each area and controls operations of a network device in accordance with the usage restriction information acquired on the basis of the registered information, it is allowed to usefully restrict the usage of the network device.

Other Embodiments

Although the embodiments of the usage management system have been discussed so far, the usage management system may be embodied in a variety of ways which are different from those of the above mentioned embodiments. Thus, embodiments which are different from the above embodiments in (1) determination of the user type, (2) usage of registered information, (3) notification of a suspicious person, (4) identification of a user, (5) a configuration and (6) a program will be discussed.

(1) Determination of User Type

The usage restriction in accordance with the user type has been discussed in the third embodiment. When the user type is "MIXED", one of the gender and the age may be preferentially adopted. For example, when a female adult is present in an area together with a male child, the usage restriction set for the male child may be adopted preferentially to the usage restriction set for the female adult. That is, in one embodiment, the user type is determined by adopting the age preferentially to the gender as the type.

(2) Usage of Registered Information

An example with the storage unit for registering information regarding users who are present in an area has been discussed in the fourth embodiment. By using the storage unit, the used amount, the operating time or the like of each network device may be summed up and accumulated for each user so as to periodically output account information. In addition, for example, an access status or the like of each user in Internet access may be output. On the basis of the above mentioned information, an authorized user may determine the usage restriction of each network device in each location area for each user to update the usage restriction information.

(3) Notification of Suspicious Person

A user who is difficult to be identified even by using the camera, the sensor or the portable terminal has been treated as an unidentified user in the above mentioned embodiments. The unidentified user may be notified as a suspicious person. For example, in the case where only unidentified users are present in an area, only unidentified users and children are present in the area, or in other similar cases, the usage management system may determine the unidentified users as suspicious people and notify a portable terminal of an arbitrary user of presence of the suspicious people. The usage management system may notify the portable terminal of presence of the suspicious people together with an image captured by the camera.

(4) Identification of User

The user is identified by using the camera and the portable terminal in the above mentioned embodiments. The user may be identified by using either one of the camera and the portable terminal.

(5) Configuration

Processing procedures, control procedures, specific names, information (for example, contents of the usage restriction and the like) including various pieces of data and parameters and the like discussed and illustrated in the specification and the drawings may be arbitrarily changed unless otherwise specified.

Each component included in the usage management system 100 or the like illustrated in the drawings is merely a conceptual one in function and need not necessarily be physically configured as illustrated in the drawings. That is, specific manners of dividing and integrating respective units are not limited to those illustrated in the drawings and all or some of the units may be functionally and/or physically divided and integrated in accordance with various loads and usage conditions in arbitrary units. For example, the operation control unit 122 may be divided into an "acquisition unit" that acquires the usage restriction information regarding a network device from the usage restriction storage unit and an "operation control unit" that controls operations of the network device in accordance with the acquired usage restriction information. A plurality of areas, that is, a plurality of sub-domains are included in the above mentioned embodiments. Alternatively, a single area may be included. In the latter case, a relay apparatus may be eliminated and a usage management system may be disposed at the location of the eliminated relay apparatus.

(6) Program

Figure 22:
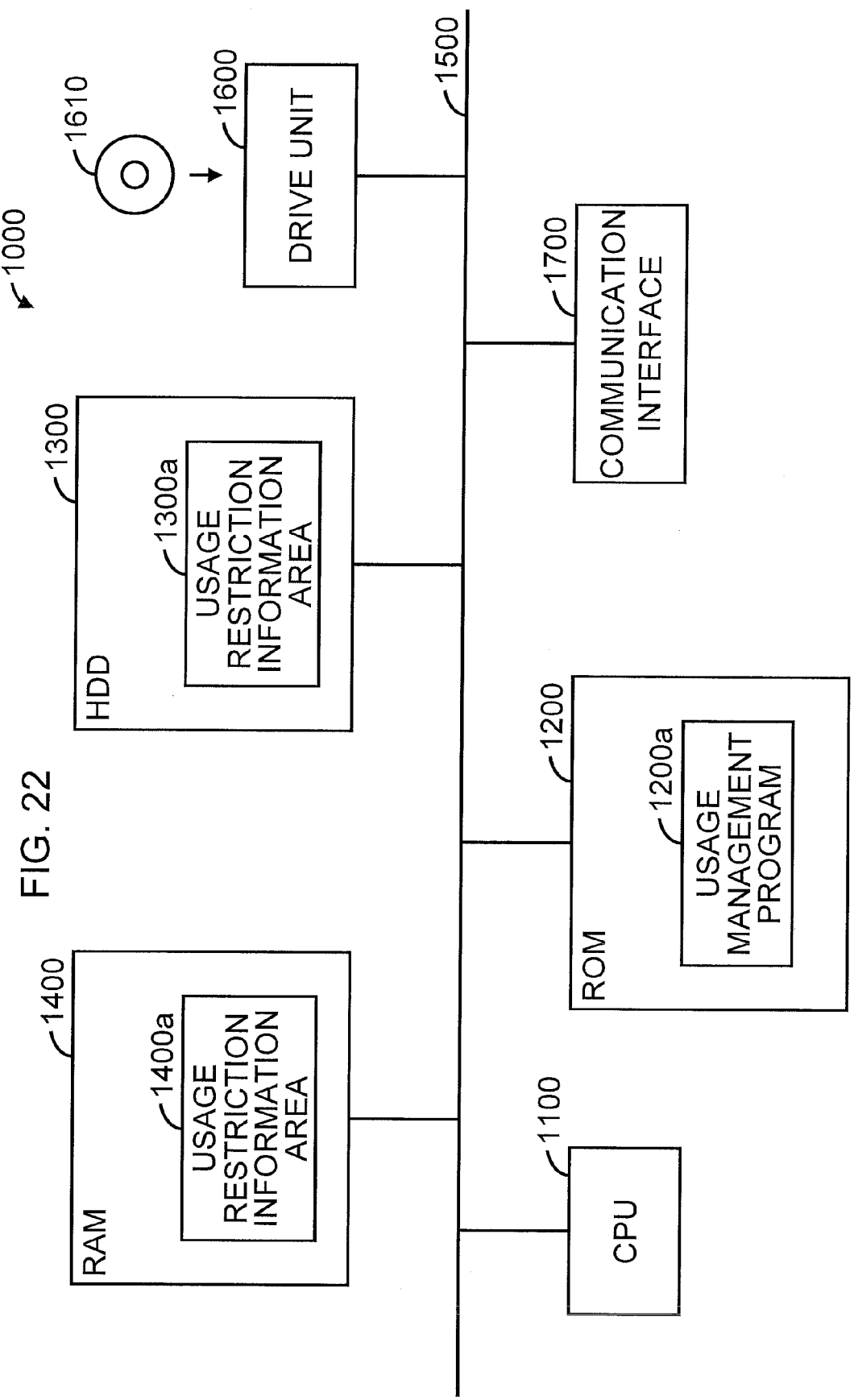
FIG. 22 is a diagram illustrating an example of a computer that executes a usage management program.

Various processes of the usage management systems discussed in the above mentioned embodiments may be also implemented by executing a program, which has been prepared in advance, by a computer system such as a personal computer, a work station or the like. FIG. 22 illustrates an example of a computer that executes a usage management program. An example of a computer that executes a usage management program for realizing similar functions to those of the usage management system discussed in respective above mentioned embodiments will be discussed.

As illustrated in FIG. 22, a computer 1000 includes a CPU 1100, an ROM 1200, a hard disk drive (HDD) 1300, an RAM 1400, a drive unit 1600 for reading data from and/or writing data to a computer-readable medium 1610, and a communication interface 1700 for establishing a connection to a communication network. These units 1100 to 1400, 1600, and 1700 are connected with one another via a bus 1500.

A usage management program for realizing similar functions to those of the area identification unit 121 and the operation control unit 122 discussed in the first embodiment is stored in advance in the ROM 1200. That is, a usage management program 1200a is stored in the ROM 1200 as illustrated in FIG. 22. The usage management program 1200a may be appropriately divided into parts. The CPU 1100 reads the usage management program 1200a out of the ROM 1200 so as to execute it. The HDD 1300 includes a usage restriction information area 1300a. The usage restriction information area 1300a corresponds to the usage restriction storage unit 111 illustrated in FIG. 2.

The CPU 1100 reads information from the usage restriction information area 1300a of the HDD 1300 and stores the read information into a usage restriction information area 1400a included in the RAM 1400. The CPU 1100 uses information stored in the usage restriction information area 1400a included in the RAM 1400 to execute the usage management program. With respect to information stored in the RAM 1400, all pieces of information need not necessarily be stored in the RAM 1400 and only information used for execution of processes needs to be stored in the RAM 1400. The usage management program need not necessarily be stored in the ROM 1200 from the beginning.

For example, the usage management program may be stored in a portable computer-readable medium 1610 such as, for example, a flexible disk (FD), a compact disc read-only memory (CD-ROM), a digital versatile disc (DVD), a magneto-optical disk, an integrated circuit (IC) card or the like which is inserted into the drive unit 1600. Then, the computer 1000 may read the usage management program out of the portable computer-readable medium 1610 and execute it. The usage management program may be stored, when delivered, in the portable computer-readable medium 1610, installed onto the HDD 1300 from the portable computer-readable medium 1610, and loaded into the RAM 1400 from the HDD 1300 when executed by the CPU 1100. The usage management program may be stored in another computer (or a server) that is connected with the computer 1000 over a communication network such as a public line, Internet, an LAN, a wide area network (WAN) or the like and then the computer 1000 may read the usage management program out of the another computer and execute the usage management program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A usage management system comprising:
   a storage to store usage restriction information indicating usage restrictions of network devices located in communication areas of a network for users of the network devices, and to store priority ordering patterns for the network devices, each priority ordering pattern indicating a priority order of users; and
   a processor to
   identify a location area which is a communication area of the communication areas in which a target network device of the network devices is located,
   identify a plurality of target users of the users present in the identified location area,
   acquire usage restriction information regarding the target network device for the identified plurality of target users from the storage,
   acquire a priority ordering pattern for the target network device from the storage; and
   control operations of the target network device in accordance with both the acquired usage restriction information and the priority order of the acquired priority ordering pattern.

2. The usage management system according to claim 1, wherein:
   the storage stores usage restriction information regarding types of users who use each network device,
   the storage stores information regarding a gender and an age of each of the users, and
   the processor
   acquires information regarding genders and ages of the identified plurality of target users from the storage;
   determines user types on the basis of the acquired information regarding the genders and the ages; and
   controls operations of the target network device in accordance with the determined user types.

3. The usage management system according to claim 1, wherein
   the processor identifies the location area and the plurality of target users on the basis of identifiers of user terminals carried by the users, an identifier of a network device, and an identifier of a relay apparatus, the identifiers being received from the relay apparatus.

4. The usage management system according to claim 1, further comprising:
   the storage stores image data of the users together with identifiers of user terminals used by the users,
   wherein
   the processor
   acquires identifiers of user terminals used by the plurality of target users from the storage on the basis of image data captured in each communication area, and
   identifies the location area and the plurality of target users present in the identified location area on the basis of the acquired identifiers.

5. The usage management system according to claim 1, wherein
   the processor identifies users present in the communication areas when the users get in and out of the communication areas.

6. A non-transitory computer readable medium storing a program that, when executed by a computer, causes the computer to execute a usage management method comprising:
   identifying a location area which is a communication area of a plurality of communication areas of a network in which a target network device of network devices that communicate on the network is located;
   identifying a plurality of target users present in the identified location area;
   acquiring usage restriction information regarding the target network device for the identified plurality of target users from a storage which stores usage restriction information indicating usage restrictions of the network devices located in the plurality of communication areas for users of the network and which stores priority ordering patterns for the network devices, each priority ordering pattern indicating a priority order of users;
   acquiring a priority ordering pattern for the target network device from the storage; and
   controlling operations of the target network device in accordance with both the acquired usage restriction information and the priority order of the acquired priority ordering pattern.

7. A usage management method executed by a usage management system, the usage management method comprising:
   identifying a location area which is a communication area of a plurality of communication areas of a network in which a target network device of network devices that communicate on the network is located;
   identifying a plurality of target users of users present in the identified location area;
   acquiring usage restriction information regarding the target network device for the identified plurality of target users from a storage which stores usage restriction information indicating usage restrictions of network devices located in the plurality of communication areas for users of the network devices and which stores priority ordering patterns for the network devices, each priority ordering pattern indicating a priority order of users;

acquiring a priority ordering pattern for the target network device from the storage; and controlling, by the usage management system, operations of the target network device in accordance with both the acquired usage restriction information and the priority order of the acquired priority ordering pattern.

8. A usage management system according to claim 1, further comprising:

relay apparatuses respectively corresponding to the communication areas, wherein each relay apparatus operates as a wireless access point in the corresponding communication area for the processor to control operations of the network devices located in the corresponding communication area, and for the users in the corresponding communication area to communicate with the usage management system.

* * * * *